United States Patent
Mansouri Rad

(10) Patent No.: US 10,979,140 B2
(45) Date of Patent: Apr. 13, 2021

(54) METHOD AND APPARATUS FOR DETECTING OPERATIONAL CONDITIONS OF AN OPTICAL LINK IN AN OPTICAL NETWORK

(71) Applicant: Mohammad Mehdi Mansouri Rad, Kanata (CA)

(72) Inventor: Mohammad Mehdi Mansouri Rad, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/506,571

(22) Filed: Jul. 9, 2019

(65) Prior Publication Data

US 2021/0013962 A1    Jan. 14, 2021

(51) Int. Cl.
H04B 10/077 (2013.01)
H04J 14/02 (2006.01)
H04B 10/035 (2013.01)
G01H 9/00 (2006.01)

(52) U.S. Cl.
CPC ......... *H04B 10/0779* (2013.01); *G01H 9/004* (2013.01); *H04B 10/035* (2013.01); *H04J 14/022* (2013.01); *H04J 14/0212* (2013.01); *H04J 14/0275* (2013.01); *H04J 14/0283* (2013.01)

(58) Field of Classification Search
None
See application file for complete search history.

(56) References Cited

U.S. PATENT DOCUMENTS

| 4,898,468 A * | 2/1990 | Udd ............... G01D 5/35383 356/483 |
| 5,296,956 A | 3/1994 | Fatehi et al. |
| 5,636,021 A * | 6/1997 | Udd ............... G01D 5/35383 356/483 |
| 2008/0129982 A1* | 6/2008 | Nakamura ........ G01M 11/083 356/73 |

(Continued)

FOREIGN PATENT DOCUMENTS

| CN | 103560824 A | 2/2014 |
| CN | 107925477 A | 4/2018 |
| CN | 109150296 A | 1/2019 |

OTHER PUBLICATIONS

A.D.Kersey et al "Distributed and multiplexed fibre-optic sensor systems"; Journal of the Institution of Electronic and Radio Engineers, vol. 58, No. 5 (Supplement), pp. S99-S111, Jul./Aug. 1988.

(Continued)

*Primary Examiner* — Darren E Wolf

(57) ABSTRACT

There is provided apparatuses to detect occurrence and location of damages on optical fiber links in advance by converting an optical span in optical network to an interferometry based sensing media. The interferometry based sensing media may enable detection of mechanical perturbation or mechanical vibration occurred on optical fiber links across optical network. The system employed with the interferometry based sensing media can detect occurrence of mechanical perturbation or mechanical vibration as well as discover the location of such event occurred using standard interferometry based sensing techniques.

25 Claims, 13 Drawing Sheets

(56) References Cited

U.S. PATENT DOCUMENTS

2015/0333826 A1* 11/2015 Farrell ............... H04B 10/0793
398/38

OTHER PUBLICATIONS

Mark R. Svinkin et al "Soil and Structure Vibrations from Construction and Industrial Sources"; Missouri University of Science and Technology Scholars' Mine; International Conference on Case Histories in Geotechnical Engineering; (2008)—Sixth International Conference on Case Histories in Geotechnical Engineering Aug. 11-Aug. 16.

Luca Schenato "A Review of Distributed Fibre Optic Sensors for Geo-Hydrological Applications"; Appl. Sci. 2017, 7, 896; oi:10.3390/app7090896.

Ali Reza Bahrampour et al "Optical Fiber Interferometers and Their Applications"; Interferometry—Research and Applications in Science and Technology; Published online Mar. 21, 2012.

Teddy Hayford-Acquah et al "Causes of Fiber Cut and the Recommendation to Solve the Problem"; IOSR Journal of Electronics and Communication Engineering (IOSR-JECE)e-ISSN: 2278-2834,p-ISSN: 2278-8735.vol. 12, Issue 1, Ver. I (Jan.-Feb. 2017), pp. 46-64.

Stuart J. Russell et al "Real-Time Location of Multiple Time-Varying Strain Disturbances, Acting Over a 40-km Fiber Section, Using a Novel Dual-Sagnac Interferometer"; Journal of Lightwave Technology, vol. 19, No. 2, Feb. 2001.

Byeong Ha Lee et al "Interferometric Fiber Optic Sensors"; Sensors 2012, 12, 2467-2486; doi:10.3390/s120302467.

Xiaoyi Bao et al "Recent Progress in Distributed Fiber Optic Sensors"; Sensors 2012, 12, 8601-8639; doi:10.3390/s120708601.

Lutang Wang et al "A Fiber Optic PD Sensor Using a Balanced Sagnac Interferometer and an EDFA-Based DOP Tunable Fiber Ring Laser"; Sensors 2014, 14, 8398-8422; doi:10.3390/s140508398.

Xin Liu et al "Distributed Fiber-Optic Sensors for Vibration Detection"; Sensors 2016, 16, 1164; doi:10.3390/s16081164.

Wen-Ge Xie et al "Optical Fiber Sensors Based on Fiber Ring Laser Demodulation Technology"; Sensors 2018, 18, 505; doi:10.3390/s18020505.

* cited by examiner

METHOD AND APPARATUS FOR DETECTING OPERATIONAL CONDITIONS OF AN OPTICAL LINK IN AN OPTICAL NETWORK

FIELD OF THE INVENTION

The present invention pertains to the field of optical communications and in particular to a method and apparatus for detecting operational conditions of an optical link in an optical network.

BACKGROUND

In today's networks, the quality of an optical link (e.g. an optical fiber or optical cable) is considered important by network operators (e.g. Bell Canada, Verizon, Google, etc.), in order for desired service levels to be provided. Any loss or quality degradation of optical fibers may directly affect the corresponding link quality metric, which typically is measured in Optical Signal-to-Noise Ratio (OSNR) and decrease the reliability of the network. Hence, a branch of optical performance monitoring (OPM) focuses on monitoring and checking statuses of optical fiber links (e.g. optical cables) for potential degradation.

Considering the amount of traffic carried on today's optical networks, the reliability of fiber optic networks has become more important, and therefore methods and systems for minimizing network outages are considered more desirable. When damage occurs to optical fiber links (e.g. fiber cuts), the network service operators may bear significant costs, such as the costs associated with the lost traffic and network outage (e.g. network down time), the costs associated with troubleshooting the problem to identify a cause, and the costs associated repair of the fiber based network infrastructure. If damage occurs to fiber optic cables under the ocean, the costs associated therewith can significantly increase. For instance, ships and boats operating close to shore may inadvertently cause damage to submarine cables, and repair of these damaged submarine optical cables can often costs millions of dollars.

Currently, optical fiber links (e.g. fiber optic cables) are deployed in a variety of diverse locations (e.g. undersea, underground and elevated in the air). For example, there are a plurality of submarine cables deployed throughout the oceans as illustrated in FIG. 1. As such, fiber optic links are exposed to potential risks associated with natural disasters, human activities, or both. In the case of terrestrial network cables (e.g. underground optical fiber links), human activities (e.g. construction, train operation, etc.) or natural phenomena (e.g. lighting, floods, earthquakes, etc.) or issues on network components (e.g. network component aging, network component failure, etc.) may cause detrimental damage to optical fiber links. In the case of submarine cables, the fiber cables can be damaged by a number of different factors. For instance, the submarine cables may be damaged by ship anchors accidentally snaring and dragging the cable, fishing trawlers nets entangling with the cable, turbidity currents, earthquakes or shark attacks.

Fiber cuts and fiber damage may occur quite frequently as illustrated in the TABLE 1 which summarizes the number of fiber cuts reported in 2016.

TABLE 1

2016 Fiber Cut (Backbone vs. Metro/FTTx)

| Type of Network | Count of Failure | % | Impacts Traffic Affecting (%) | Non-Traffic Affecting (%) |
|---|---|---|---|---|
| Backbone | 189 | 53.54 | 9.52 | 90.48 |
| Metro/FTTx | 164 | 46.46 | 49.39 | 50.61 |
| Total | 353 | | | |

Given the importance of the network reliability and the high risk of damage to optical fiber links, many network operators have network control and management system(s) (e.g. transport software-defined networking (T-SDN)) to effectively control and re-route traffic when damage occurs, for example fiber cuts.

However, with currently available network control and management systems, the timing and location of cable damage may be difficult to identify quickly. For example, in the case of terrestrial networks, most data traffic may pass through legacy fibers, for example cables deployed a long time ago and in such cases it may be difficult to rapidly identify where the damage has occurred (e.g. location of damaged part in the optical network) because the cable map may not be known due to a lack of data or security purposes.

Therefore there is a need for methods and apparatuses to detect the occurrence and location of damage to optical fiber links that is not subject to one or more limitations of the prior art. Due to the increasing amount of network traffic, it is desired to predict or quickly identify whether any damage has occurred to optical fibers in order that the network service providers or network operators can take appropriate actions as soon as possible, and in some instances in a proactive manner. Knowing the occurrence and location of potential cable damage in advance can be valuable when considering that accidents like fiber cuts typically occur in sub-seconds. Thus knowing of potential damage in advance may provide a sufficient amount of time for T-SDN to decide and perform appropriate actions (e.g. planning a new topology for wave division multiplexing (WDM) channels in order to re-route network traffic in response to predicted cable damage) thereby mitigating the effect of the potential cable damage.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide apparatuses and methods to detect the occurrence and location of damage to optical fiber links in a pre-emptive manner. In embodiments, there are provided methods and apparatuses to substantially convert an optical span in optical network into an interferometry based sensing media for detecting optical fiber characteristics of the optical span thereby predicting or identifying potential damage occurrence in the optical span.

According to an aspect of the present invention, there is provided an apparatus for detecting operational conditions of optical fiber. The apparatus includes a probe transceiver module that is communicatively connected to a first end of a first optical fiber span and a first end of a second optical span. The probe transceiver module includes a transmitter configured to send an optical probe signal, wherein the optical probe signal can be transmitted into both the first end of the first optical fiber span and the first end of the second optical fiber span. The probe transceiver module further includes a receiver configured to receive a first returning optical probe signal from the first end of the first optical fiber span and a second returning optical probe signal from the first end of the second optical fiber span. The apparatus further includes a loop back module communicatively connected to a second end of the first optical fiber span and a second end of the second optical fiber span, wherein the loop back module is configured to transfer optical signals between the first optical fiber span and the second optical fiber span. The combining of the first returning optical probe signal and the second optical probe signal enables detection of operational conditions of the optical fiber including the first optical fiber span and the second optical fiber span.

In some embodiments, the probe transceiver module includes a coupler communicatively connected to the first end of the first optical fiber span and the first end of the second optical fiber span, wherein the coupler is configured to combine the first returning optical probe signal and the second optical probe signal. In some embodiments, the probe transceiver module further includes a photodiode for detecting a signal indicative of the combination of the first returning optical probe signal and the second returning optical probe signal, wherein the signal is indicative of the operational conditions of the optical fiber.

In some embodiments, the probe transceiver module is communicatively connected a digital signal processor which is configured to evaluate the signal and determine the one or more operational conditions of the optical fiber. In some embodiments, the digital signal processor forms a portion of the probe transceiver module. In other embodiments, the digital signal processor is remote from the probe transceiver module and is communicatively connected to the probe transceiver module for receiving the signal. In some embodiments, the digital signal processor is communicatively connected to one or more probe transceiver modules for the evaluation of signals generated by the one or more probe transceiver modules wherein each of these signals is indicative of operational conditions of the optical fiber associated therewith.

According to an aspect of the present invention there is provided an apparatus for detecting operational conditions of optical fiber. The apparatus includes a probe transceiver module communicatively connected to a first end of an optical fiber span. The probe transceiver module includes a transmitter to send an optical probe signal, wherein the optical probe signal is transmitted into the first end of the optical fiber span. The probe transceiver module further includes a receiver to receive a returning optical probe signal from the first end of the optical fiber span. The apparatus further includes a loop back module communicatively connected to a second end of the optical fiber span, wherein the loop back module is configured to reflect the optical probe signal back to the probe transceiver module along the optical fiber span. The combining of the returning optical probe signal and the optical probe signal enables detection of operational conditions of the optical fiber of the optical fiber span.

According to some embodiments, the receiver includes a coupler communicatively connected to the first end of the optical fiber span and the transmitter, wherein the coupler is configured to combine the returning optical probe signal and the optical probe signal. The receiver further includes a photodiode for detecting a signal indicative of the combination of the returning optical probe signal and the optical probe signal, wherein the signal is indicative of the operational conditions of the optical fiber.

According to some embodiments, the apparatus further includes a digital signal processor configured to evaluate the signal for determination of the operational conditions of the optical fiber. According to some embodiments, the digital signal processor forms a portion of the probe transceiver module. In other embodiments, the digital signal processor is remote from the probe transceiver module and is communicatively connected to the probe transceiver module for receiving the signal.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
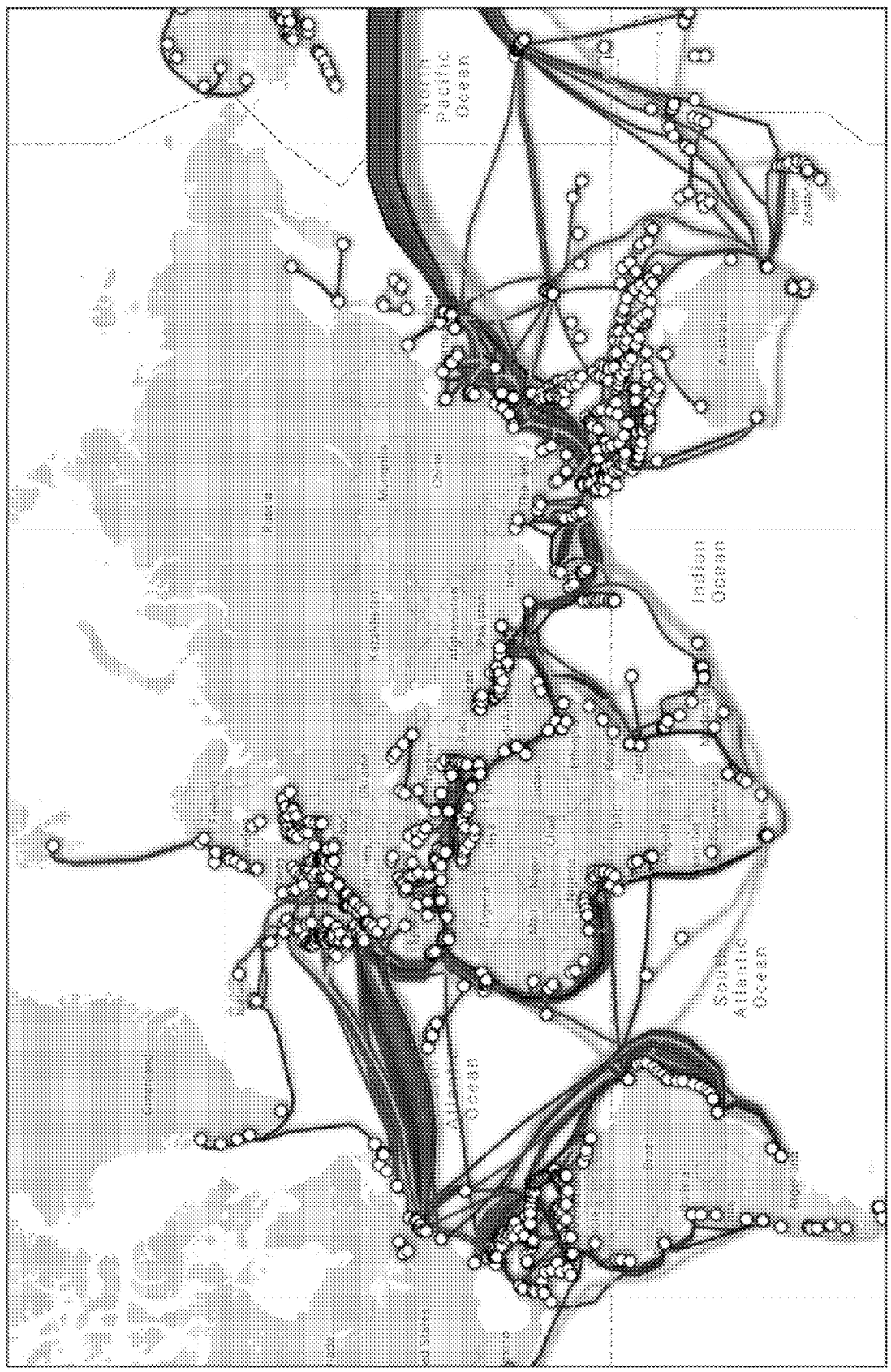
FIG. 1 illustrates a map of plural submarine optical cables deployed within the oceans.

There is provided apparatuses and methods to detect the occurrence and location of damage on optical fiber links in advance by converting an optical span in optical network to an interferometry based sensing media. The interferometry based sensing media (e.g. interferometer) can provide significant benefits to the network service providers by enabling the detection of mechanical perturbation or mechanical vibration which may be present on optical fiber links across optical network. The system employed with the interferometry based sensing media can detect the occurrence of mechanical perturbation or mechanical vibration on an optical fiber link as well as at least partially isolate the location of such events using interferometry based sensing techniques.

According to embodiments, there is provided an apparatus for detecting operational conditions of optical fiber. The apparatus includes a probe transceiver module that is communicatively connected to a first end of a first optical fiber span and a first end of a second optical span. The probe transceiver module includes a transmitter configured to send an optical probe signal, wherein the optical probe signal can be transmitted into both the first end of the first optical fiber span and the first end of the second optical fiber span. The probe transceiver module further includes a receiver configured to receive a first returning optical probe signal from the first end of the first optical fiber span and a second returning optical probe signal from the first end of the second optical fiber span. The apparatus further includes a loop back module communicatively connected to a second end of the first optical fiber span and a second end of the second optical fiber span, wherein the loop back module is configured to transfer optical signals between the first optical fiber span and the second optical fiber span. The combining of the first returning optical probe signal and the second optical probe signal enables detection of operational conditions of the optical fiber including the first optical fiber span and the second optical fiber span.

According to embodiments, the probe transceiver module includes a coupler communicatively connected to the first end of the first optical fiber span and the first end of the second optical fiber span, wherein the coupler is configured to combine the first returning optical probe signal and the second optical probe signal. The probe transceiver module further includes a photodiode for detecting a signal indicative of the combination of the first returning optical probe signal and the second returning optical probe signal, wherein the signal is indicative of the operational conditions of the optical fiber.

According to embodiments, the probe transceiver module is communicatively connected a digital signal processor which is configured to evaluate the signal and determine the one or more operational conditions of the optical fiber. In some embodiments, the digital signal processor is integrated into the probe transceiver module. In other embodiments, the digital signal processor is communicatively connected to one or more probe transceiver modules for the evaluation of signals generated by the one or more probe transceiver modules wherein each of these signals is indicative of operational conditions of the optical fiber associated therewith. According to some embodiments, the operational conditions can include one or more of vibrations and locations of vibrations associated with the optical fiber.

It has been determined that if network service operators are provided with warning signs for a potential damage to optical cables before occurrence of the actual damage, the network operators may be able to reduce various costs including costs associated with the lost traffic and network outage (e.g. cost associated with a network down time), cost to troubleshoot the problem, and cost to repair the fiber based network infrastructure. For example, if network service providers detect mechanical vibrations in advance, the negative effect of network service disruption can be mitigated. In most cases, especially for terrestrial cables and subsea cables, if mechanical vibration can be detected at least in part in real-time, network service operators can predict potential damage to optical cables. This allows network service operators to mitigate costs from potential fiber failure or client service interruptions. For example, by preventing at least some fiber cuts or fiber damage to an optical fiber caused by external forces, network downtime and repair costs can be mitigated and possibly minimized.

In recent years, upon spending significant time and efforts, both network service vendors and operators determined that wavelength divisional multiplexing (WDM) network service outage and WDM network service performance declines are mainly due to transient events such as fast state-of-polarization (SOP) rotation. Natural phenomena such as lightning can create large SOP rotation and may result in WDM network service outage or performance decline for short periods of time. Most natural phenomena do not create long lasting impacts on the network as such issues regarding the performance of the optical network links and can often disappear relatively quickly, for example typically in less than a few milliseconds. For instance, coherent transponders may experience high bit error rate (BER) or frame-loss due to fast SOP rotation for a short period of time but resume their typical performance within a few milliseconds.

It has been seen that fast transient events may restrain the network service vendors and operators from providing guaranteed network performance, which can be a result of there being no certain way of minimizing the negative effects of fast transient events unless capabilities of coherent engines are improved. While fast transients in optical networks can be monitored by checking and tracking the SOP of light, such monitoring techniques may only be useful for the purpose of debugging and troubleshooting transients in the optical network.

Unlike fast transient events, the negative effect of more static and longer-lasting events (e.g. damage to fiber links or fiber cuts) can be prevented or mitigated. For example, if damage to the optical fiber links can be detected as early as possible or can be predicted prior to the occurrence of the damage, then the cost associated with network downtime and traffic interruption can be reduced. The cost associated with network downtime and traffic interruption can indicate that it is important to have proactive schemes, rather than responsive or passive ones. However, while the network providers have been facing problems with respect to detecting damage to the optical fiber links, there has been no particular solution proposed by the network providers.

It is known that damage to the optical fiber links, including fiber cuts, are often preceded by mechanical vibration experienced by the optical fiber links. For instance, a number of activities performed during construction (e.g. digging) often create mechanical perturbations which, especially when continuously occurring, typically result in damage to the optical cables which can result in network traffic interruption. The mechanical vibrations may provide useful information on imminent issues so that the network service providers can proactively prevent fiber cuts, minimize network service outage and prepare alternative plans for network service outage. Thus, detection of mechanical perturbation on the optical cables can provide important benefits as the detection thereof can allow the network service providers to a higher quality of network service and reduce minimize network service outage or interruptions.

Figure 2:
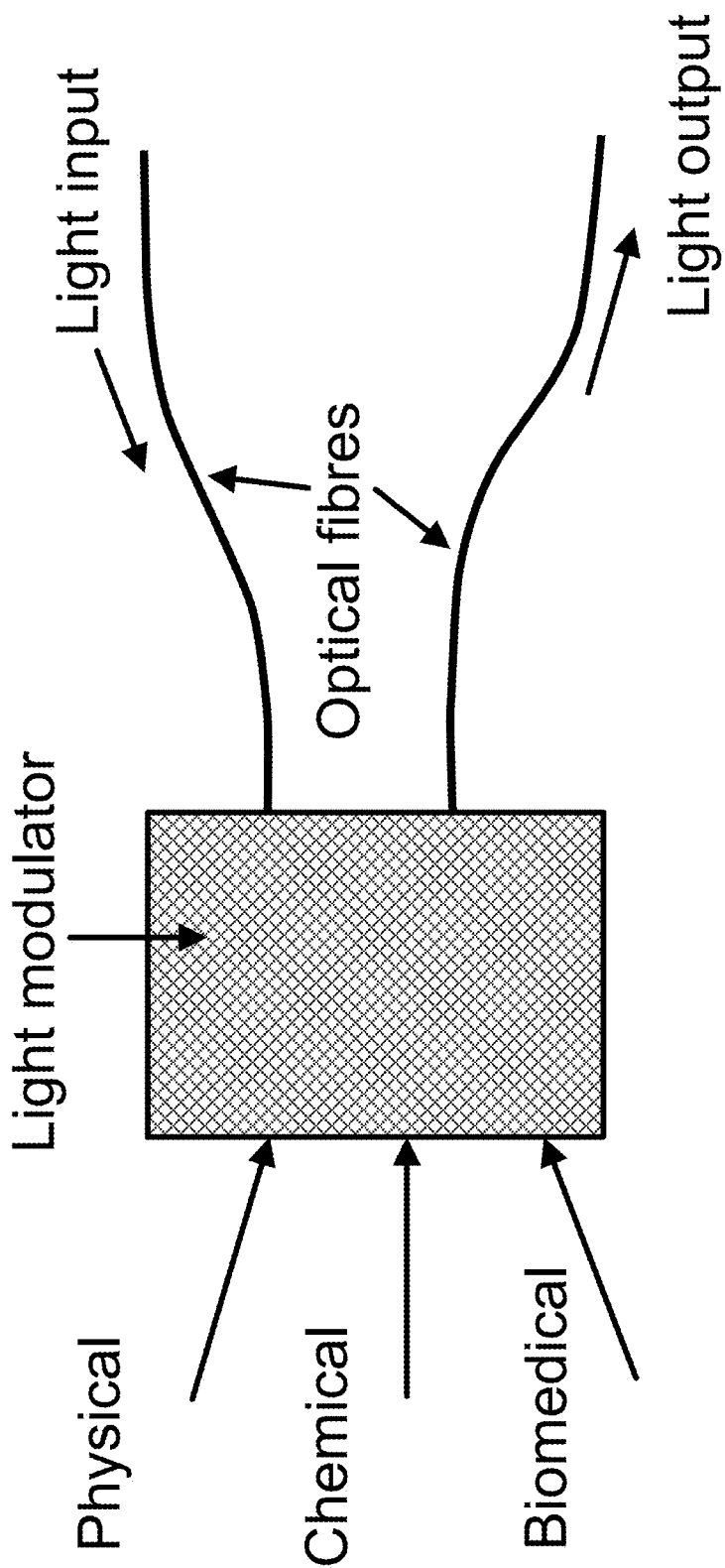
FIG. 2 illustrates the basic functions of an optical fiber sensor in a localized sensing scheme.
Figure 3:
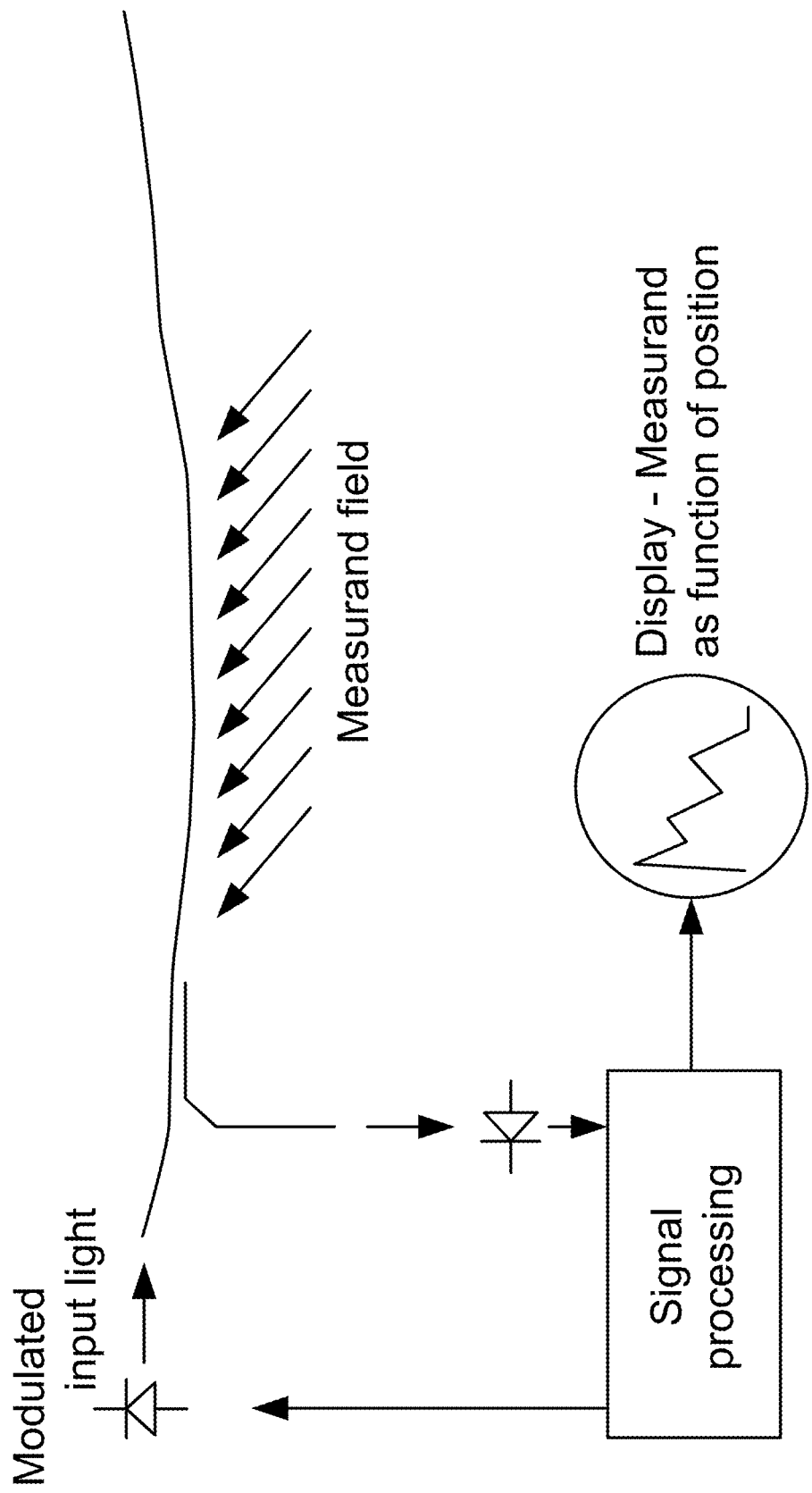
FIG. 3 illustrates a generic distributed sensing scheme using elastic (linear) or inelastic (non-linear) backscattered light as an information carrier.

There are several sensing methods that support the detection of events such as mechanical perturbations. In a localized sensing scheme, light may be modulated by being exposed directly or indirectly to physical or chemical phenomena. In this method, fibers (e.g. optical fiber links) are not typically involved in the sensing process. FIG. 2 illustrates the basic functions of the optical fiber sensor based on a localized sensing method. The localized sensing method is typically neither relevant to nor adopted by fiber optic telecom systems. In a distributed sensing method, reflections from backscattered signals may be measured to detect mechanical perturbations (e.g. distances may be used). In this method, fibers (e.g. optical fiber links) may be the key sensing components. FIG. 3 illustrates a concept of the generic distributed sensing method using elastic (linear) or inelastic (non-linear) backscattered light as an information carrier. In a discrete sensing method, events may be detected using multiple sensing components distributed across the optical network links (e.g. fiber Bragg grating (FBG), reflectors, mirrors). In a hybrid sensing method, two or more different sensing methods may be jointly used for various applications.

It is understood, that most mechanical vibrations, which typically range between 10 Hz and 1000 Hz, on optical fiber links and other mechanical and physical infrastructure can be detected by distributed fiber sensing mechanisms using various fiber optic based methods. These fiber optic based evaluation methods can be divided into two main categories, for namely a scattering based method and an interferometric sensing method.

For a scattering based method, the reflected signals scattered at each point of the fiber are collected at the transmission point. This collection of signals can be considered to be similar to techniques used for optical time-domain reflectometer (OTDR) method, such as the phase-OTDR method and the coherent-OTDR method.

The scattering based method or scattering OTDR based method can typically only be efficiently used for detecting steady state or quasi-steady state changes. As backscattering of light is very weak (e.g. up to 50 dB lower than normal reflections), the detection of backscattering light needs to be performed with many data acquisition periods and average these acquisition periods in order to determine a clear "picture" of the components of the optical fiber links. These plural data acquisition periods can reduce the speed of monitoring and thus may be considered to not be suitable for tracking and observing transient or semi-transient events on optical fiber links. The monitoring speed of the scattering based method is affected by the dynamic range of the pulse width as well as the length of the optical fiber links, which can be used to determine the pulse repetition rate. Moreover, the trade-off between dead zones and distance ranges can limit the type of applications for which the scattering based method can be employed. Therefore, the scattering based method may be considered to be most suitable for static events. For example, the scattering base method may be used for fiber placement validations and qualifications for example during and after the initial placement of the fiber, during and after fiber damage repair, and during fiber maintenance. The scattering based sensing method may be able to detect, using high reflections, whether the optical fiber links are pinched, damaged or cut. The scattering based sensing method may also be able to detect, using high reflections, the location of fiber link cuts or other damages.

As noted above another fiber optic based evaluation method is the interferometric sensing method. The interferometric sensing method can detect physical and mechanical events quickly thus may be suitable for fast events, for example dynamic and short term events, such as (mechanical) vibrations.

In an interferometric sensing method, the optical fiber links under test (e.g. the optical fiber links being monitored) may be integrated into an interferometer thus the optical fiber under evaluation are converted into a part of the interferometer. The interferometer may observe variations of the interferometric signal (e.g. interferometric signal generated by a laser source) to detect or sense events that may negatively affect the optical fiber links.

Interferometric sensing methods may be beneficial in terms of sensing mechanical vibrations on the optical fiber links, especially in WDM networks. The interferometric sensing schemes may allow the interferometer to detect small mechanical perturbation even with a minimal loss of the probe signal.

As scattering or reflection techniques are not used, averaging is not needed for the interferometric sensing method, thereby enabling an interferometer to perform fast measurement of the optical link. This speed of detection can be distinguished from OTDR techniques where averaging is needed to improve the reliability of the measurement. The interferometer may use strong optical signals to discover transient or semi-transient events and detect the location of those events. As such the strong optical signals used to detect transient or semi-transient events may allow the interferometer to perform fast and reliable monitoring for the optical fiber links.

The interferometric sensing method may support the detection of mechanical perturbation which may occur at a variety of distances including longer distances. As such, the interferometric sensing method can be suitable for fiber placement validations and qualifications across the optical network, during and after deployment of the fiber, during and after fiber damage (e.g. fiber cuts) repair, and during fiber maintenance.

As noted above, according to embodiments, there is provided apparatuses to predict or detect the occurrence and location of damage to optical fiber links by converting an optical span (e.g. optical fiber link between two optical nodes in both directions) in optical network into an interferometry based sensing media. The converted optical span may detect mechanical perturbations and vibrations on an optical fiber and may further support troubleshooting regarding optical fiber performance.

According to embodiments, the optical span may be converted to a part of the interferometer (e.g. interferometric sensing media). Each optical fiber link of the optical span may act as an arm of the interferometer. According to embodiments, the replacement or modification of (other) existing network components in the network is not required. For example, if the interferometric wavelength(s) band is aligned with the OSC bands, the existing network components including amplifiers, for example erbium-doped fiber amplifiers (EDFAs), optical fibers and wavelength selective switches (WSS) may not need to be modified. In this instance, the amplifiers (mainly EDFAs) are equipped with OSC waveband filters for the purpose of adding and dropping OSC channels. This beneficial characteristic of the interferometric wavelength(s) band may enable upgrades without needing to change other equipment other than monitoring devices or modules. If the OSC functionality is also needed, as described elsewhere herein, OSC and interferometry functionalities may be integrated together in the same module. According to embodiments, various schemes therefor can be employed.

In some embodiments, one or more probe transceiver modules can be employed for the interferometry sensing media (hardware). The probe transceiver module can control the probe signal, for example the transmission and reception of an optical probe signal, to detect mechanical perturbation on the optical links. In some embodiments, through the inclusion of optical circulators and couplers, an optical supervisory channel (OSC) path may be transformed into an interferometry system (e.g. interferometer). In some embodiments, switches may be also added to transform the OSC path into the interferometry system (e.g. interferometer). In some embodiments, a probe transceiver module can be separate from an OSC module associate with the optical path, and in other embodiments, the functionality of the probe transceiver module is integrated into the OSC module.

According to embodiments, single wavelength or multiple wavelengths may be employed for the interferometry sensing media. In some embodiments, as all amplifiers, for example EDFAs, are integrated with or communicatively connected to 1510 nm waveband filters, the optimal waveband for interferometric sensing methods may be overlapped with the OSC channel. In some cases, the wavelength used by interferometric sensing method may be equivalent to that used by OSC. In some embodiments, a separate waveband hardware component may be deployed for the use of multiple wavelengths.

According to embodiments, the apparatus to detect mechanical perturbations on the optical fiber links may be capable of detecting or sensing mechanical vibrations on each network span in real-time with a desired level of reliability. According to embodiments, full network visibility can be provided if apparatuses are distributed at each network span across the optical network. When full network visibility is provided, the apparatus may be able to determine a physical location in the optical network where the mechanical perturbation has occurred or is occurring. For example, the discovery or identification of the location of the mechanical perturbation is desired to enable preventive follow-up actions and/or the determination of alternative plans. The apparatus may be able to detect mechanical perturbations while the network is in service. Existing approaches for detecting mechanical perturbations are not able to operate while the network is in service as the existing approaches rely on dark or un-used fibers for detection.

According to embodiments, the apparatus may be able to detect various events generating mechanical vibration in a wide range of magnitudes and speeds (e.g. fast, moderate or slow) regardless of whether the mechanical vibration occurs due to natural phenomena (e.g. lighting, earthquake, etc.), human activities (e.g. construction, train, ship, etc.) or issues relating to network components (e.g. network component aging, network component failure, etc.). In some embodiments, the apparatus may be configured to detect mechanical vibrations at a pre-determined and specific wavelength. However, some embodiments of the apparatus enable the use of a variety of wavelengths for the detection process.

In various embodiments, the apparatus may be simple and cost-effective and can be integrated into one or more of the existing components of the optical network. In some embodiments, the apparatus may be formed to form one or more a plug-in components.

Figure 4:
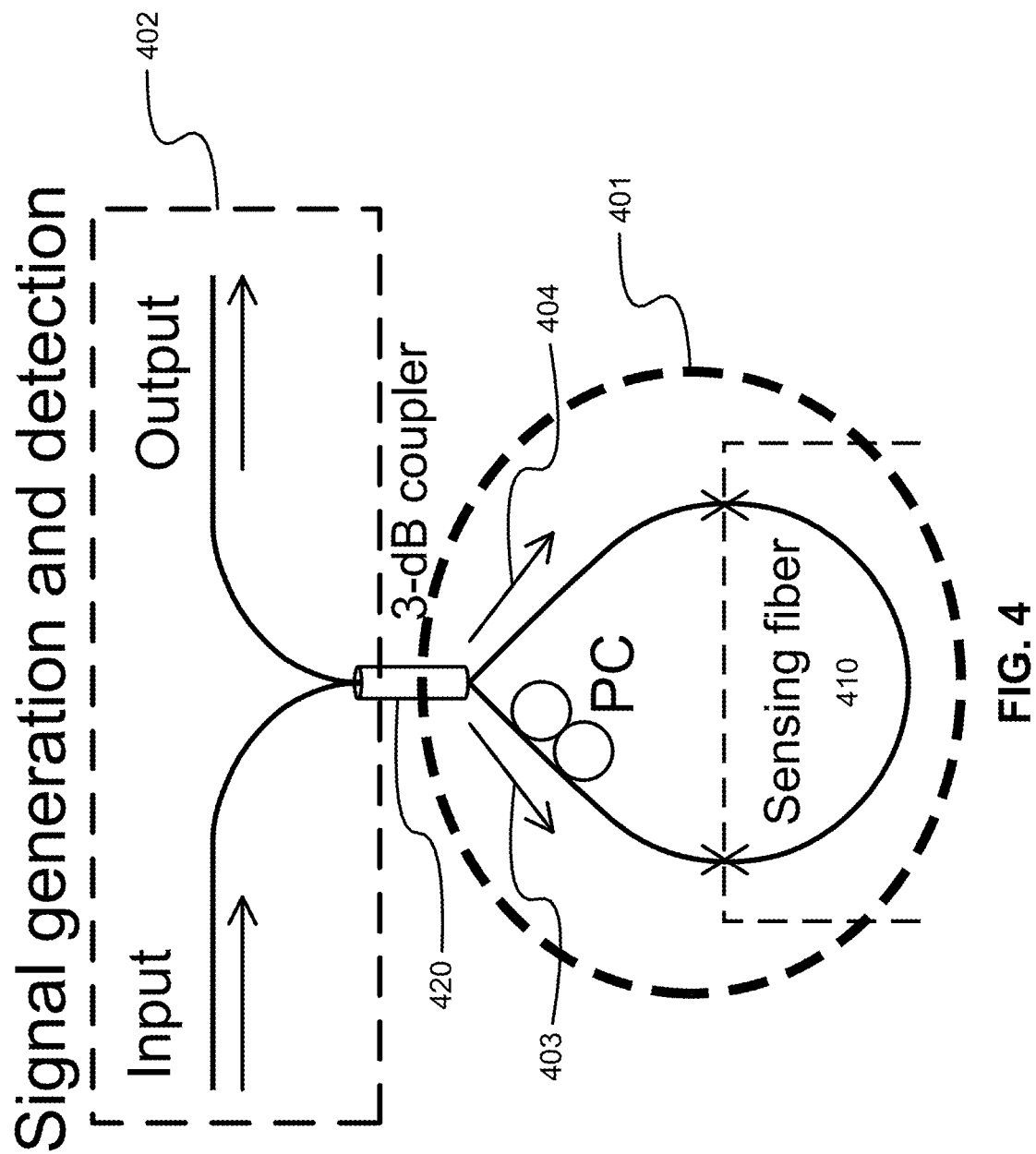
FIG. 4 illustrates a schematic diagram of an interferometry system based sensing mechanism known as a Sagnac interferometer.

FIG. 4 illustrates a schematic diagram of an interferometry based sensing mechanism known as a Sagnac interferometer. As illustrated in FIG. 4, the Sagnac interferometer includes an optical fiber loop (e.g. the sensing loop 401), along which two beams that are propagating in two different directions. In some embodiments, the beams are in the same polarization, however in other embodiments, these beams may have different polarization states. The input light is split into two directions by the 3 dB fiber coupler 420 and the two counter-propagating beams are combined again at the 3 dB fiber coupler 420. In s Sagnac interferometer, reference light experiences the same phenomena while travelling in these different directions.

Referring to FIG. 4, the Sagnac interferometer 400 has two main components, namely the sensing loop 401 and the probe signal generation and detection component 402. The sensing loop 401 carries a reference signal propagating there along in opposite directions, wherein the probe signal (e.g. input signal) is guided in these opposite directions by the sensing fiber 410. The two counter-propagating signals 403 and 404 (e.g. signals propagating along the fiber in opposite directions) each affected by any events present on the fiber and subsequently carry information indicative of the location of an event. Upon receipt of these signals, the relative delay between events represented in the received signals can provide a means for the identification of the location of the event that had occurred along the fiber under test.

A variety of methods can be used for detecting the occurrence and location of perturbations such as thermal changes of the fiber or mechanical vibrations applied to the fiber. Sagnac interferometers can be configured in various ways for probe signal generation and detection. For example, Sagnac interferometers may be configured to use a single wavelength or multiple wavelengths for testing. Sagnac interferometers may include the use of a coherent probe signal source or a broadband probe signal source. According to embodiments, Sagnac interferometers may be configured as a Mach-Zehnder interferometer (MZI) or a semiconductor optical amplifier (SOA) based.

Figure 5:
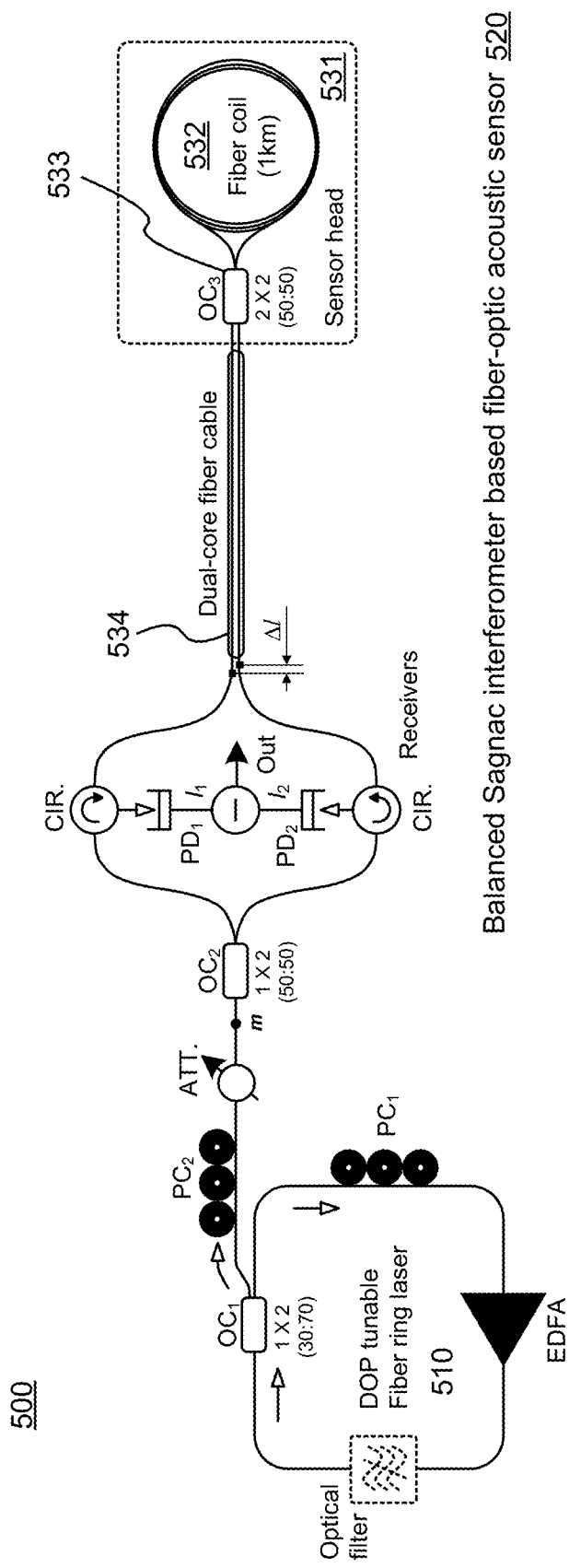
FIG. 5 illustrates a schematic diagram of a fiber optic acoustic sensor for partial discharge monitoring of power transformers.

FIG. 5 illustrates a schematic diagram of a fiber optic acoustic sensor for partial discharge monitoring of power transformers. The fiber optic acoustic sensor 500 includes a EDFA-based fiber ring laser 510 as a light source and a balanced fiber Sagnac interferometer 520 (or balanced Sagnac sensor 520) as the sensor. The EDFA-based fiber ring laser 510 may be designed and configured in accordance with a specific probe signal generation and detection algorithm which can be distinguished from the probe signal generation and detection of FIG. 4 (e.g. the probe signal generation and detection 402). The EDFA-based fiber ring laser 510 operating in chaotic mode may provide a partially polarized output beam with the required degree of polarization (DOP) value.

As illustrated in FIG. 5, the balanced Sagnac sensor 520 includes two individual, identical Sagnac interferometers. Both Sagnac interferometers share the fiber coil 532 as the sensor head 531 and using two relevant, low-coherent probe lights with identical optical power. The sensor head 531 includes the fiber coil 532, a fiber coil made of a 1 km-long single-mode fiber, and the 2×2 optical fiber coupler 533. The sensor head 531 may be similar to the sensing loop 401 illustrated in FIG. 4. The sensor head 531 is connected to the system with the dual-core fiber cable 534. The fiber cable 534 can be extended to over 1 km in length, if required in actual applications. There is a length difference, denoted as Δl in FIG. 5, between two transmission fibers in the dual-core fiber cable 504. In this sensor configuration, since the two detection outputs, $I_1$ and $I_2$ coming from the upper and lower Sagnac interferometers, respectively, are in anti-phase, the final detection output can be obtained through a differential operation achieved in the electrical domain using $I_1$ and $I_2$.

Figures 6A, 6B:
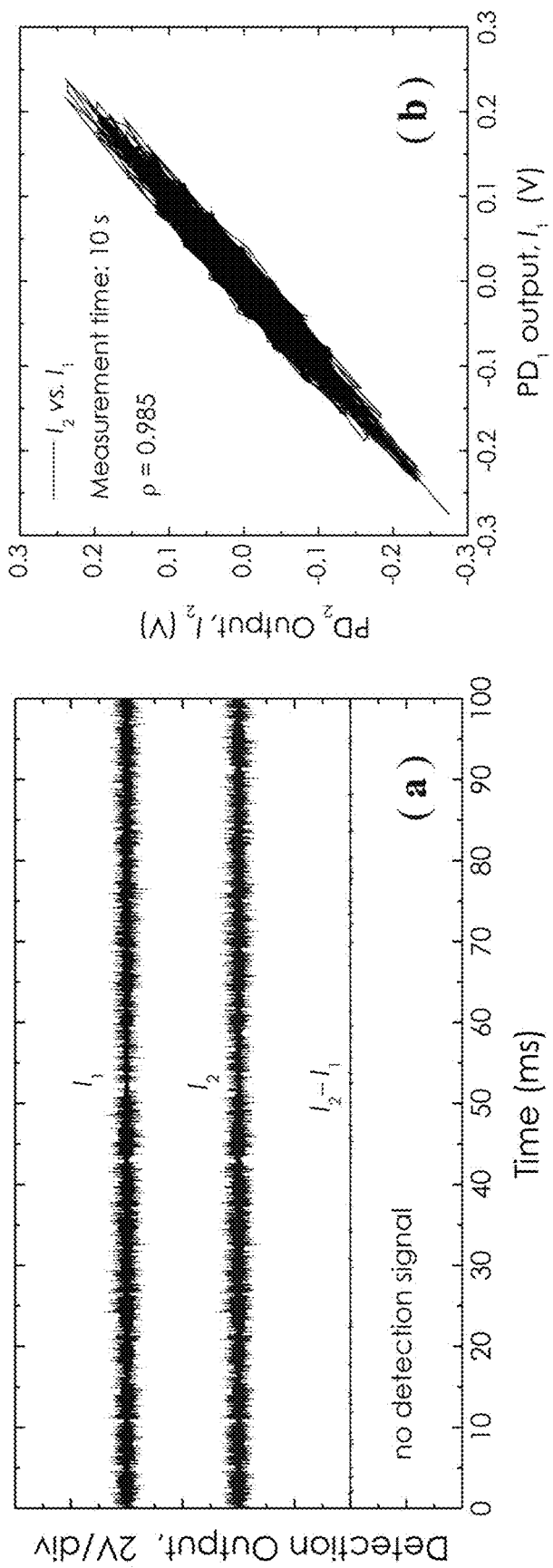
FIG. 6A illustrates three detected signal waveforms obtained in the absence of external acoustic disturbances, detected by a Sagnac interferometer of FIG. 5.
FIG. 6B illustrates a measured result related to the cross-correlation property of two detection outputs based on FIG. 6A, obtained during a measurement period of 10 seconds.

The two detected outputs $I_1$ and $I_2$ of the balanced Sagnac sensor 520 may be measured in order to determine whether there has been mechanical vibration along the fiber. For instance, under normal circumstances (e.g. when there are no mechanical vibrations or external acoustic disturbances), the two detected outputs (e.g. $I_1$, $I_2$) of the two counter-propagating probe signals are constant and have similar powers, as illustrated in FIGS. 6A and 6B. FIG. 6A illustrates three detected signal waveforms obtained in the absence of external acoustic disturbances. FIG. 6B illustrates a measured result related to the cross-correlation property of the two detection outputs, $I_1$ and $I_2$ in FIG. 6A, obtained during a measurement period of 10 seconds. This correlation graph represents the similarity or cross-correlation degree of the two outputs $I_1$ and $I_2$ of the balanced Sagnac sensor 520.

Figure 7A:
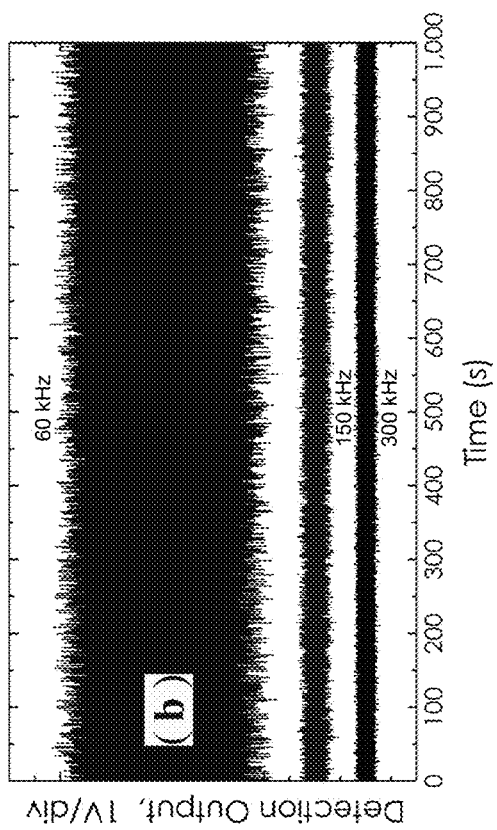
FIG. 7A illustrates three detected signal waveforms obtained upon detection of mechanical vibration applied to a balanced Sagnac sensor, detected by a Sagnac interferometer of FIG. 5.
Figure 7B:
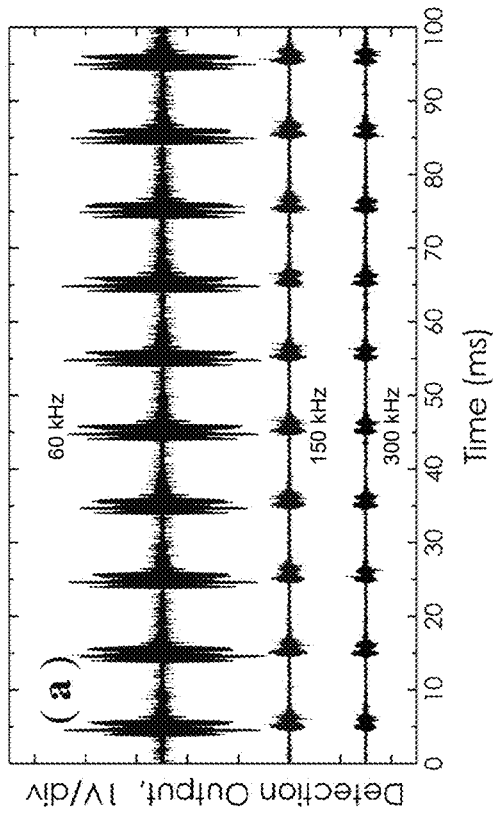
FIG. 7B illustrates three detected signal waveforms measured for long-term stability at three different frequencies up to 300 KHz, detected by a Sagnac interferometer of FIG. 5.

In some instances, when there are mechanical vibrations or external acoustic disturbances along the fiber under evaluation, the two detected outputs (e.g. $I_1$, $I_2$) of the two counter-propagating probe signals fluctuate and may include plural high peaks, as illustrated in FIGS. 7A and 7B. FIG. 7A illustrates three detected signal waveforms obtained in the presence of mechanical vibration applied to the fiber under evaluation by the balanced Sagnac sensor 520 illustrated in FIG. 5. The signal waveforms are measured at three different frequencies up to 300 KHz, which can be representative of the balanced Sagnac sensor 520 of FIG. 5 being capable of detecting for example mechanical vibrations of up to 300 KHz. FIG. 7B illustrates three detected signal waveforms measured for long-term stability at the three different frequencies up to 300 KHz. The signal waveforms are measured for a range of up to one thousand seconds.

Whether there mechanical perturbation or vibration is present along the fiber under evaluation may be determined from these measurement results. The difference signal (e.g. $I_2$-$I_1$ illustrated in FIG. 6A, namely the signal difference between two counter-propagating probe signals) may indicate the occurrence of mechanical vibration on the optical fiber links being evaluated. FIGS. 6A and 6B shows that the two counter-propagating signals are strongly correlated and thus it can be determined that during testing no mechanical vibration occurred on the optical fiber links. FIGS. 7A and 7B shows that the measured signal waveforms include at least some fluctuations thus at least some external mechanical vibration occurred on the optical fiber links during testing.

In addition, information regarding the location of a mechanical vibration can also be extracted from the two counter-propagating signals, as the event's impact on the probe signal (e.g. signal indicative of mechanical vibration) to propagate in two different directions can be correlated. As such, the location of the event (e.g. mechanical vibration) can be concurrently detected upon the occurrence of that event.

In light of the above, interferometry based methods can have the capability of detecting the occurrence of mechanical vibrations (or other events) on an optical fiber as well as determining the location of the mechanical vibrations (or other event) across the optical fiber being evaluated. By evaluating the optical fibers of an optical network the overall network can be evaluated for events and locations thereof along the fibers of the optical network. In some interferometry based methods, probe generation and detection can be based on the MZI based architecture.

Figure 8A:
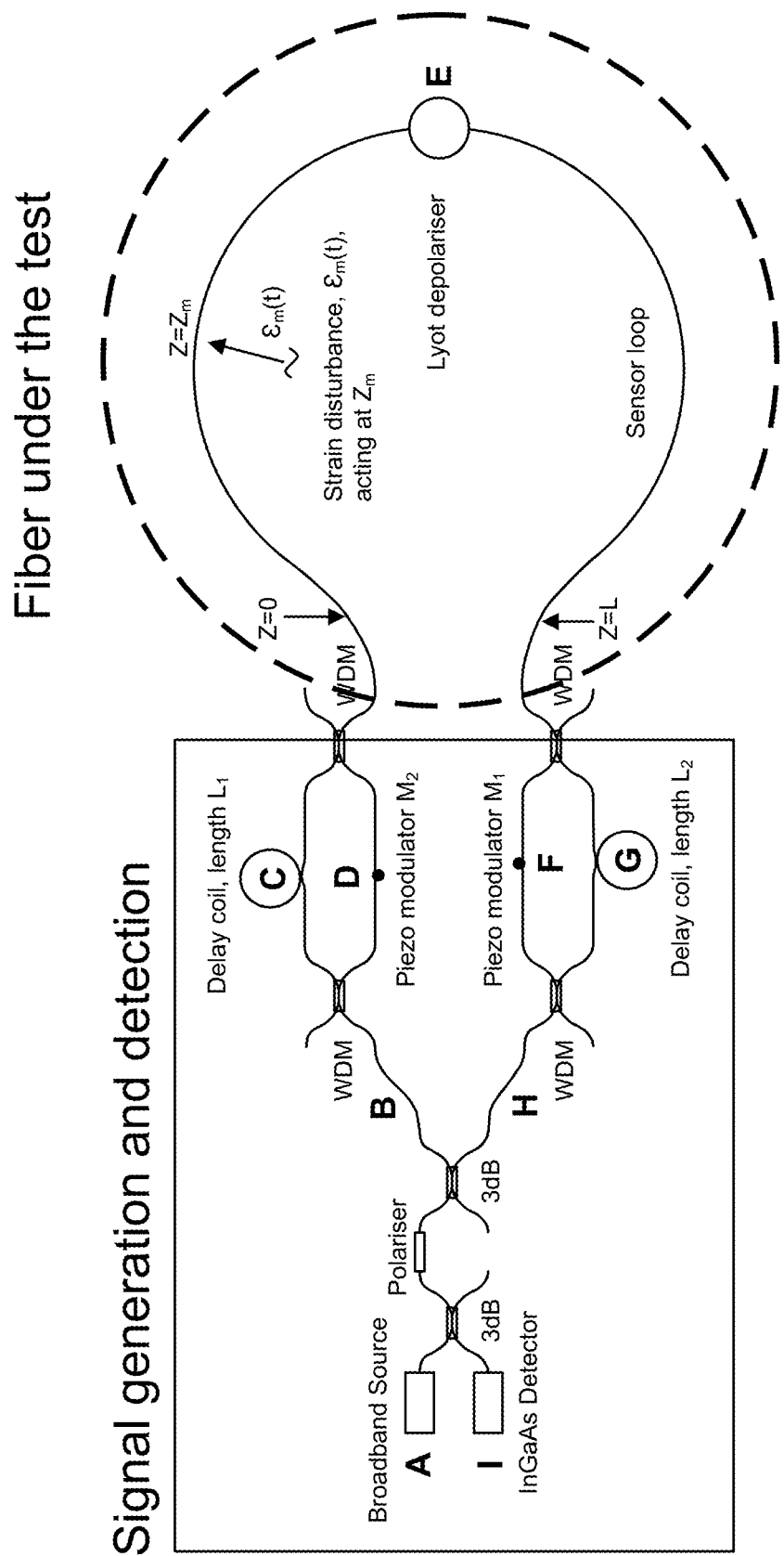
FIG. 8A illustrates a schematic diagram of an implementation of an interferometry system based sensing mechanism for an optical fiber.
Figure 8B:
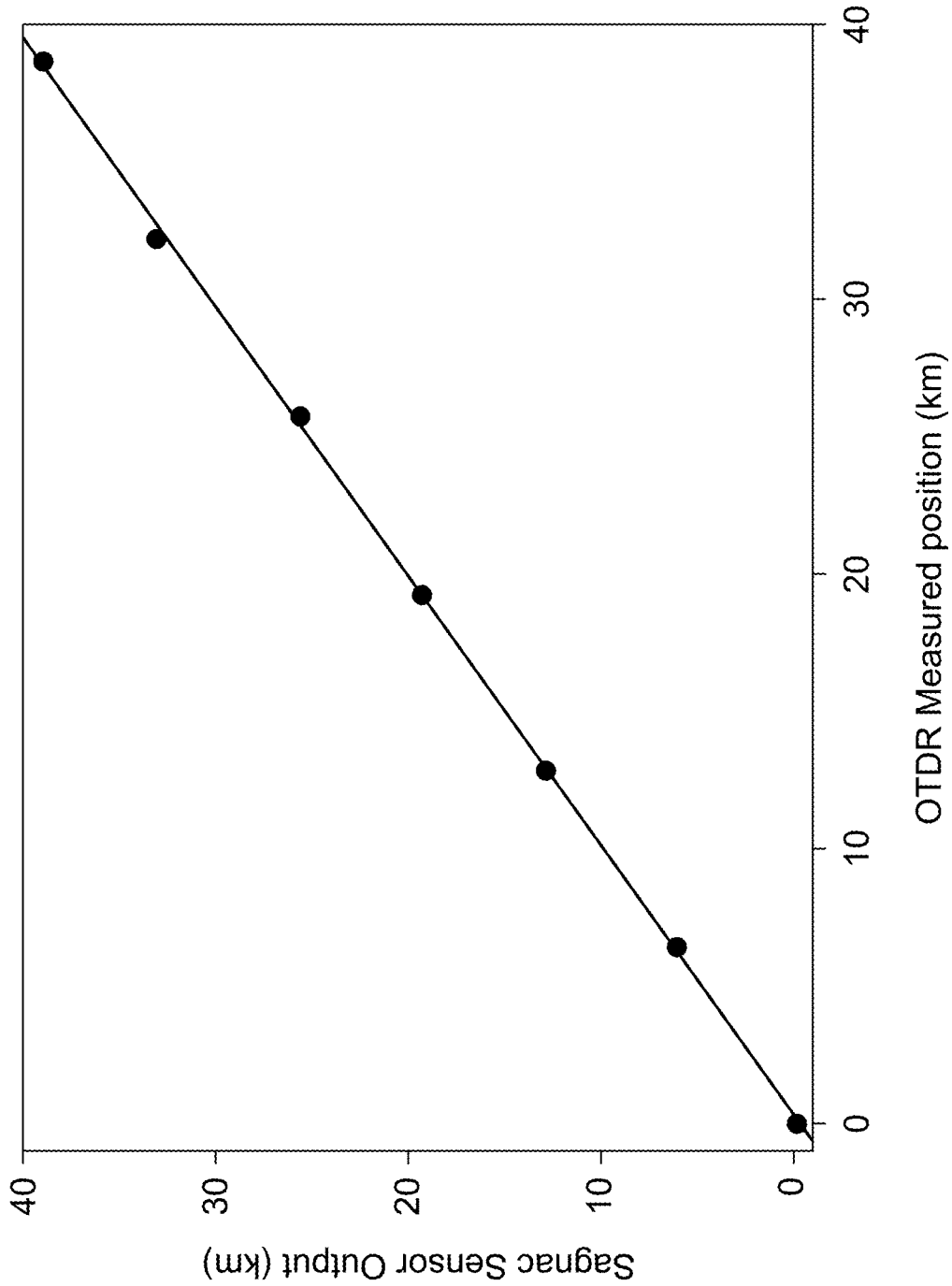
FIG. 8B illustrates the results for 100 averages of a tone disturbance of 125 Hz acting at several positions around the sensing loop of the dual-Sagnac architecture.

FIG. 8A illustrates a schematic diagram of another implementation of an interferometry based sensing mechanism (e.g. Sagnac interferometer). The architecture shown in FIG. 8A is an optical architecture of a dual-wavelength, dual-Sagnac interferometer. In FIG. 8A, two Sagnac interferometers are formed by spectral slicing and optical routing of a broad-band super-luminescent fiber source, such that each interferometer shares a common, offset section of the sensing loop. The signals generated by a time-varying strain disturbance may then be observed for each of the interferometers by a common optical detector. FIG. 8B illustrates results for 100 averages of a tone disturbance of 125 Hz, producing a phase perturbation 0.1 rad in amplitude which is acting at several positions around the sensing loop of the dual-Sagnac interferometer. Based on the results illustrated in FIG. 8B, it can be seen that a MZI based method may be designed to accurately point out the location of a disturbance (e.g. a location of mechanical vibration) for lengths up to 40 km and with an approximate resolution of 100 m. As noted above, FIG. 8B illustrates the results from 100 averages at each disturbance point, with each disturbance point corresponding to a selected position around the loop. The straight line through the points of the graph of FIG. 8B (sensor output and the measured disturbance position) demonstrates the linearity of the system and the agreement with the theoretical response for a tone disturbance as detected by the MZI based method.

According to embodiments, the optical span (e.g. optical fiber link between two network nodes) may be converted into an interferometry based sensing media. The interferometry based sensing media may detect mechanical vibrations which occur on the optical fiber links using standard interferometry based sensing techniques.

Embodiments can rely on existing architecture and hardware design of the amplifiers (e.g. EDFAs) deployed in the optical network thus there may be no additional cost to replace deployed fibers and amplifiers may not be required. In some embodiments, pluggable OSC waveband modules can be designed to be integrated with the probe transceiver modules, which in some instances may be configured as pluggable modules.

As illustrated above, the interferometry based sensing method can detect the occurrence and identify the location of mechanical vibrations using the fiber optic media of transmission. To take advantage of the interferometry based sensing method in the WDM transport layer (e.g. the optical fibers), the WDM span can be converted into an optical fiber loop. In various embodiments, existing fiber spans in both directions may be converted into an interferometric loop or sensing loop. The converted interferometric sensing loop (e.g. the interferometric sensing loop comprising of an optical fiber from point A to point B and an optical fiber from point B to point A) can be configured to perform tests and measurements in order to detect any mechanical vibrations on the WDM fiber optic transport network, using interferometric sensing techniques. These sensing techniques are equivalent to or substantially similar to the ones used by with existing interferometry based sensing media.

By converting the WDM span into an optical fiber loop, detecting the occurrence and location of mechanical vibrations may be achieved using existing hardware design and architecture of network nodes (e.g. amplifiers).

Figure 9:
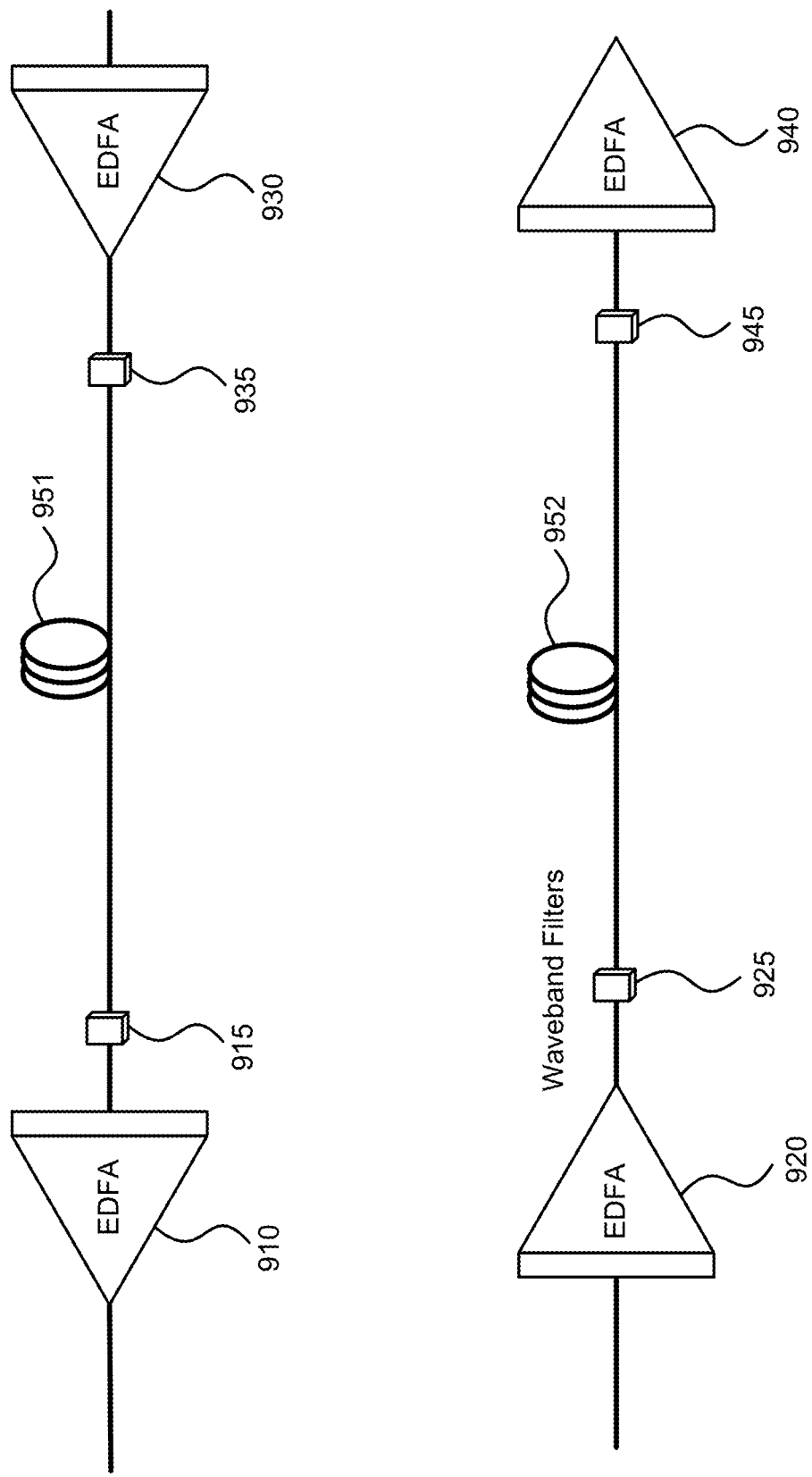
FIG. 9 illustrates a schematic diagram of an optical span between two optical amplifier nodes in an optical network.

FIG. 9 illustrates a schematic diagram of an optical span between two optical amplifier nodes in an optical network. Referring to FIG. 9, two network nodes, the EDFAs 910 and 930, may be deployed in the optical network. The EDFAs 910 and 930 may be connected to each other through the fiber optic cable 951. Similarly, the EDFAs 920 and 940 may be deployed on the optical networks and the EDFAs 920 and 940 may be connected to each other through the fiber optic cable 952. The network traffic direction on the fiber optic cable 951 may be opposite to the network traffic direction on the fiber optic cable 952. For instance, the network traffic may flow from EDFA 930 to EDFA 910 on the fiber optic cable 951, and flow from EDFA 920 to EDFA 940 on fiber optic cable 952.

Between the two EDFAs deployed on the same fiber optic cable, there may be two WBFs (waveband filters) such that each WBF is coupled to the input or output of the EDFAs. In some embodiments, the WBFs may be part of the amplifiers (e.g. EDFA). The WBFs may add or drop optical supervisory channel (OSC) channels before or after network traffic passes through the amplifiers (e.g. WDM traffic passes through EDFAs where all OSC traffics are dropped or added at each node.). The WBFs may be operating at one or more pre-defined wavelengths (e.g. 1510 nm). In some cases, the WBFs may be integrated into the amplifiers (e.g. the WBFs are not separate modules from the amplifiers). In some cases, the WBFs may operate on the OSC waveband. In some cases, instead of WBFs, other waveband filters with add/drop schemes may be used to add, block, pass or redirect modulated infrared (IR) and visible light beams of various wavelengths. In some instances, WBFs and other waveband filters with add/drop schemes may be part of the optical network.

Referring to FIG. 9, the WBF 915 is communicatively coupled to the input of the EDFA 910 and the WBF 935 is communicatively coupled to the output of the EDFA 930. The WBF 915 may be placed proximate to or near the input of the EDFA 910 and the WBF 935 may be placed proximate to or near the output of the EDFA 930. The WBFs 915 and 935 are communicatively connected to each other through the fiber optic cable 951. In a similar manner, the WBF 925 is communicatively coupled to the output of the EDFA 920 and the WBF 945 is communicatively coupled to the input of the EDFA 940. The WBF 925 may be placed proximate to or near the output of the EDFA 920 and the WBF 945 may be placed proximate to or near the input of the EDFA 940. The WBFs 925 and 945 are communicatively connected to each other through the fiber optic cable 952. According to embodiments, when the waveband is or can be considered as an OSC waveband, existing network components deployed on the network can be exploited and minimal changes for implementation of an interferometry based sensing media may be required. In some embodiments, the interferometry based sensing functionalities may be integrated with the OSC module(s).

According to embodiments, the presence of WBFs can provide at least in part the capability of converting the two links (e.g. fiber optical cables 951 and 952) into an interferometry based sensing media. By connecting WBFs on two different links, the optical span can be converted into the interferometric sensing loop (e.g. the interferometric sensing loop comprising optical fiber spans 951 and 952). For instance, the WBF 915 and 935 may be communicatively connected to the WBFs 925 and 945, respectively, thereby creating a loop. The loop created using the WBFs may operate as an interferometric sensing loop and detect mechanical vibrations on the fiber optic links in both directions (e.g. the fiber optic cables 951 and 952).

Figure 10:
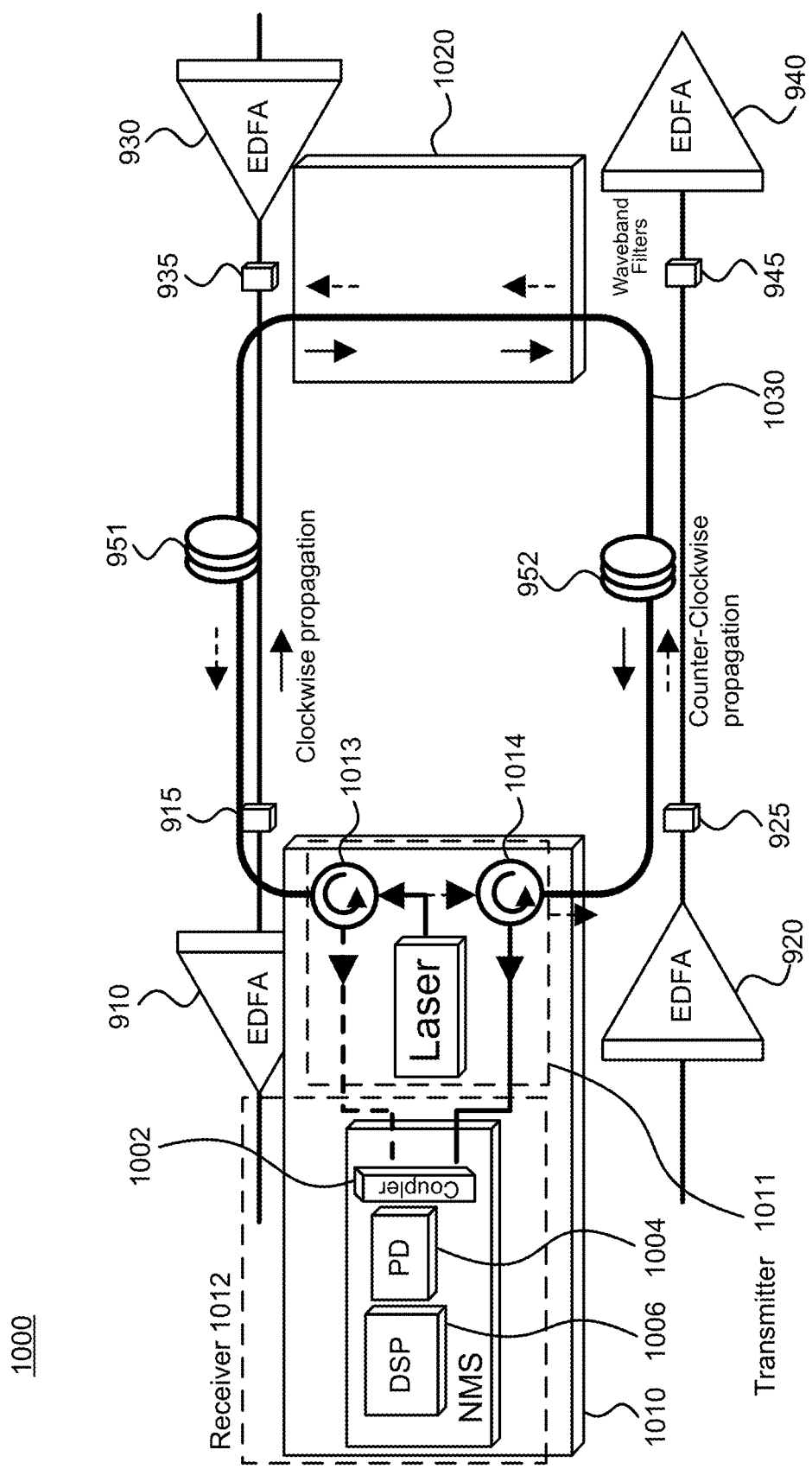
FIG. 10 illustrates an example implementation for converting an optical span into an interferometry based sensing mechanism for existing optical transport networks, in accordance with embodiments.

In accordance with embodiments, FIG. 10 illustrates an example implementation for converting an optical span into an interferometry based sensing mechanism for existing optical transport networks.

According to embodiments, the waveband filters operating at one or more pre-defined wavelengths (e.g. WBFs 915, 925, 935, 945) may be used to convert the optical span (e.g. amplifier-to-amplifier, EDFA 920-to-EDFA 940) into an interferometric sensing loop (e.g. the interferometric sensing loop 1030) as required by the interferometry based sensing mechanism 1000.

According to embodiments, the interferometric sensing loop 1030 may be created using existing line components (e.g. the amplifiers and fiber optic cables) together with a probe transceiver module 1010 and a loop back module 1020). In some embodiments, the probe transceiver module and a loop back module may be pluggable. In some embodiments, the probe transceiver module and loop back module may be integrated into other existing pluggable components such as small form-factor pluggables (SFPs). In some embodiments, the probe transceiver module functionality can be integrated or activated within an OSC module when sensing mechanical vibrations is desired. In some embodiments, the probe transceiver module may operate in parallel to OSC channel.

According to embodiments, the interferometric sensing loop 1030 may be defined by communicatively connecting the fiber optic cables 951 and 952 using the WBFs 915, 925, 935, 945, probe transceiver module 1010, and the loop back module 1020. The WBFs 915 and 925 may be communicatively connected to each other through the probe transceiver module 1010, and the WBFs 935 and 945 may be communicatively connected to each other through the loop back module 1020.

According to embodiments, the probe transceiver module 1010 can carry out the functions of sending and receiving the probe signal to perform interferometric tests and measurements to sense potential mechanical vibrations along the WDM fiber optic transport network. For that, the probe transceiver module 1010 can include electro-optic components including a transmitter 1011 and a receiver 1012. The transmitter 1011 can send an optical probe signal and the receiver 1012 can receive the optical probe signal. The optical probe signal can be transmitted and received in order to detect mechanical perturbation along the optical links using known interferometry based sensing techniques. The probe transceiver module 1010 may further include circulators 1013 and 1014. The circulators 1013 and 1014 can effectively control the direction of optical probe signal flow within the probe transceiver module 1010. Each of circulators 1013 and 1014 can be communicatively connected to each of the transmitter 1011 and the receiver 1012.

According to embodiments, the probe transceiver module 1010 can also be communicatively connected with the WBF 915 and 925 thereby connecting the input of the EDFA 910 to the output of the EDFA 920. The WBFs 915 and 925 can be filters operative at one or more predefined wavelengths (e.g. 1550 nm). In some embodiments, the WBFs 915 and 925 can be implemented in EDFAs 910 and 920, respectively, for the OSC channels.

According to embodiments, the loop back module 1020 can provide port-to-port connectivity, which can provide the capability to send the received probe signal back to the probe transceiver module 1010 via the mated optical fibre. The loop back module 1020 can communicatively connect the WBFs 935 and 945 thereby connecting the input of the EDFA 940 to the output of the EDFA 930. The WBFs 935 and 945 can be filters operative at one or more predefined wavelengths (e.g. 1550 nm). In some embodiments, the WBFs 935 and 945 may be implemented in EDFAs 930 and 940, respectively, for OSC channels. In some embodiments, the WBFs 935 and 945 may be WBF-OSCs (waveband optical supervisory channel (OSC) filters) and may be integrated into the amplifiers (e.g. EDFA) deployed in network.

According to embodiments, the probe transceiver module and the loop back module together can provide two primary functionalities, namely the ability to send and receive the optical probe signals and the capability to provide the necessary loop back (e.g. loop back functionality). In some embodiments, the probe transceiver module and the loop back module can be deployed at different locations. For example, depending on the functions to be performed at each location, a transceiver module (e.g. a portion of the probe transceiver module 1010) can be deployed at one location and a complementary module (e.g. the loop back module 1020) may be deployed at the other location.

According to embodiments, the optical probe signal can be propagating in two directions (e.g. clockwise and counter-clockwise along the defined optical loop) in the interferometry based sensing mechanism 1000. As such, the interferometry based sensing mechanism 1000 can detect the occurrence and location of mechanical vibrations on the optical links using existing interferometry based sensing techniques.

As illustrated in FIG. 10 the returning signals resulting from the transmitted optical probe signal are received at coupler 1002. For each optical probe signal there will be one returning signal from the counter clockwise propagation of the optical probe signal and one returning signal from the clockwise propagation of the optical probe signal. The resultant of these coupled signals is transferred to photodetector 1004 for detection, and the detected optical signal is subsequently transmitted to a digital signal processor 1006 for analysis. As previously discussed, for an interferometric analysis the resultant of the coupled optical signals can result in a destructive combination, thus substantially cancelling each other out upon coupling when there is essentially no perturbations experienced by the optical probe signal. However, when perturbations are experienced by the optical probe signal, the digital signal processor can be configured to analyses the output from the photodetector in order to evaluate the magnitude and location of the one or more perturbations along the optical link being evaluated.

It will be understood that the output from the photodetector can be transmitted to a local signal processing system or alternately can be transmitted to a regional network processing system or an overall network processing system. This configuration can dependent on the desired functionality of the optical link testing mechanism. In other embodiments, the evaluation of the output of the photodetector may be performed locally and output of the analysis can be subsequently transmitted to a regional or overall network processing system for the determination of subsequent actions to be taken if necessary.

As defined above, in some embodiments the interferometry based sensing mechanism is configured using two separate modules (e.g. the probe transceiver module and the loop back module) as illustrated in FIG. 10. It is realised that such an implementation may not be desired in some instances as it may not be effective in terms of optical system operation. Accordingly, in some embodiments, a universal module with the capabilities to perform the functionalities of both the probe transceiver module and the loop back module may be more desirable from the perspective of system operation. A universal module may be deployed within the network at a selected location, which can be based on ease of deployment for example, and the universal module can be managed and controlled by a network controller (e.g. transport software defined networking (T-SDN) controller). According to embodiments, the universal module can be configured to have an adjustable functionality, which may the functionality of the probe transceiver module (e.g. transceiver functionality) or the loop back module (e.g. loop back functionality) or a combination thereof. According to embodiments, the network controller may determine the functionality of a universal module or plurality of universal modules deployed on the network can perform. The functionality performed by each universal module may be changed or adjusted depending on circumstances. In some embodiments as illustrated in FIG. 11, the universal module is configured to provide the full functionalities of both the probe transceiver module and the loop back module.

Figure 11:
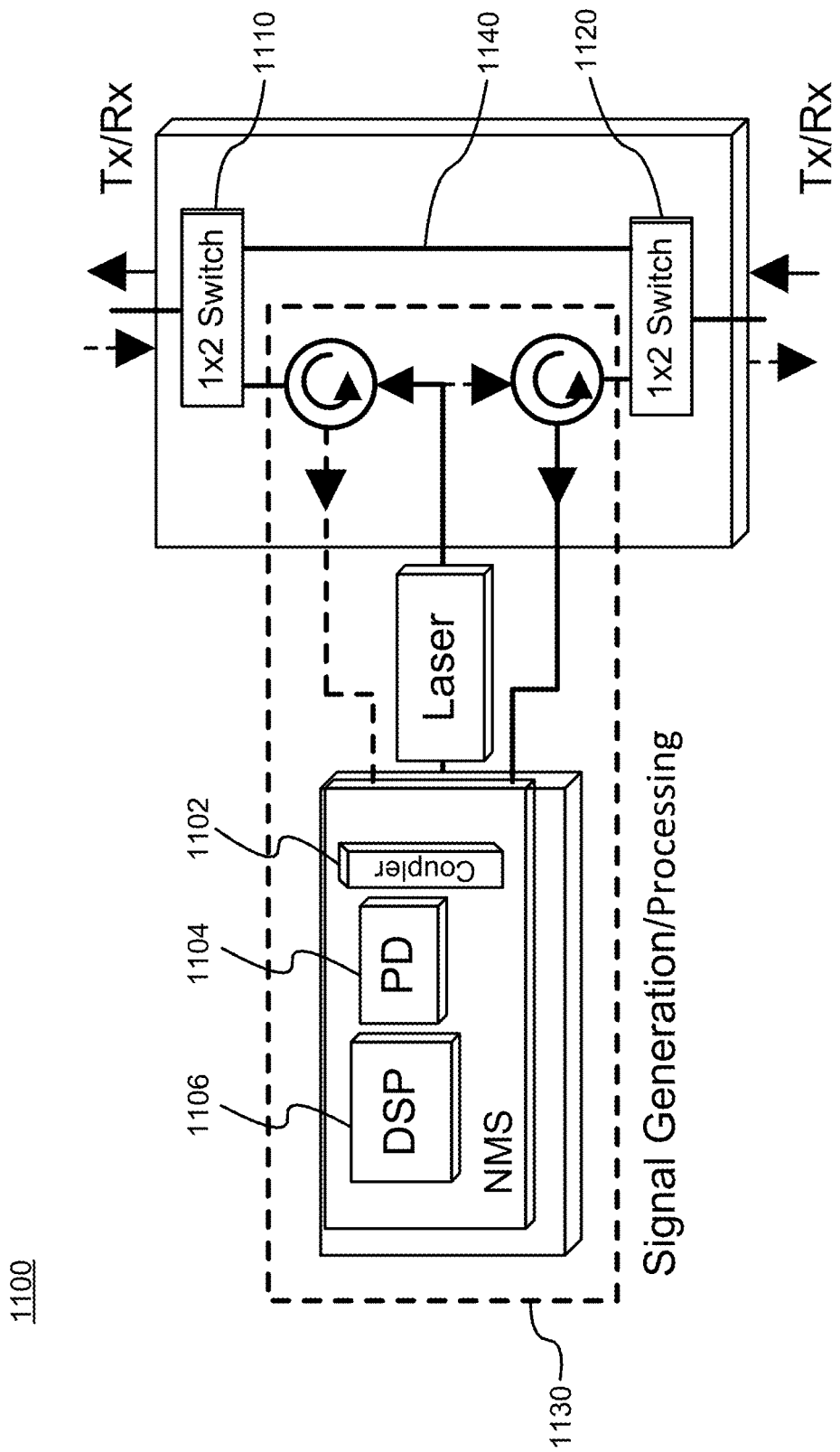
FIG. 11 illustrates, in a schematic diagram, an example universal module consolidating transceiver module and loop back module, in accordance with embodiments.

FIG. 11 illustrates a schematic diagram of a universal module consolidating the probe transceiver module and loop back module, in accordance with embodiments. The universal module 1100 is configured to perform the functionalities of the probe transceiver module (e.g. transceiver functionality) and the loop back module (e.g. loop back functionality) illustrated in FIG. 10. Namely, the universal module is configured to send and receive the optical probe signals to provide the loop back of the optical probe signals.

According to embodiments, optical switches 1110 and 1120 included in the universal module 1100 can be operative using various technologies such as micro-electro mechanical systems (MEMS) and silicon-photonics. For each span, the network controller (e.g. T-SDN controller, domain optical Controller (DOC), sectional optical controller (SOC)) can determine whether the universal module 1100 module is to provide the functionality including the transceiver functionality or loop back functionality. According to embodiments, the network controller can adjust the functionality to be carried out by the universal module 1100 using the optical switches 1110 and 1120. The optical switches 1110 and 1120 may selectively switch-on and switch-off the ports, depending on the required or determined functionality that the universal module 1100 is to perform.

According to embodiments, the universal module 1100 can be designed and configured to be deployed at a variety of nodes in the optical network and coordinate with other adjacent nodes in order to sense mechanical vibration on the optical fiber links. As such, from a deployment perspective, essentially one type of module is deployed at each node across the network, wherein the functionality of this type of module can be defined later depending on the desired functionality thereof. Due to ease of deployment and adjustment of module functionality, embodiments including a universal module 1100 may be desired in some instances.

In some embodiments, the design of a universal module 1100 may be enhanced by integrating the probe transceiver functionality and loop back functionality into the existing OSC pluggable modules which are deployed to perform control and operation, administration and maintenance (OAM) functionalities for network nodes. In some embodiments, the design of the universal module 1100 can be enhanced by employing multi-wavelength strategies so that both ends of the optical span can simultaneously perform interferometric measurement. For example, the universal module can be configured to simultaneously transmit wavelength probes signals of different wavelengths, for performance of the interferometric analysis of the optical fibre links. According to embodiments, the optical switches (e.g. the optical switches 1110 and 1120) in the universal module (e.g. the universal module 1100) may need to perform switching and also support the proper filtering of the desired interferometric-wavelength. The support for the proper filtering of the desired interferometric-wavelength may facilitate the universal module to operate as a "loopback component" and "transceiver component" at the same time.

According to embodiments, the universal module 1100 can perform the both probe transceiver functionality and loop back functionality from the perspective of the interferometry based sensing mechanism of the transformed optical span. In some embodiments, the universal module 1100 may be integrated into other existing pluggable components such as OSC-SFPs. In some embodiments, the universal module 1100 may have added the functionality of sensing mechanical vibrations when needed. In some embodiments, the universal module 1100 may operate in parallel to the OSC channel.

In some embodiments, the universal module 1100 may send and receive signals in a single wavelength to perform mechanical perturbation detection. In some embodiments, the universal module 1100 may send and receive signals in multiple wavelengths to perform independent parallel mechanical perturbation detection for both directions of optical fiber links.

Referring to FIG. 11, the universal module 1100 can include the probe transceiver module 1130 and the optical switches 1110 and 1120. The probe transceiver module 1130 may be substantially equivalent to the probe transceiver module 1010 illustrated in FIG. 10, with respect to components and their functionalities. The probe transceiver module 1130 may be communicatively coupled to one port of the optical switch 1110 and one port of the optical switch 1120, as illustrated in FIG. 11. The remaining ports of the optical switches 1110 and 1120 may also be communicatively connected to each other via the optical fiber 1140, as illustrated in FIG. 11. When the universal module 1100 needs to perform probe transceiver functionality, the optical switches 1110 and 1120 selectively switch-on the ports connected to the probe transceiver module 1130 and switch-off the ports coupled to the optical fiber 1140. When the universal module 1100 needs to perform loop back functionality, the optical switches 1110 and 1120 selectively switch-off the ports connected to the probe transceiver module 1130 and switch-on the ports coupled to the optical fiber 1140.

According to embodiments, the probe transceiver module 1130, for example the module surrounded by the dotted box in FIG. 11, may employ known interferometry based sensing techniques and schemes including probe signal generation, signal detection and signal analysis. Some of the interferometry based sensing techniques and schemes are illustrated above in the instant application. The universal module 1100 may detect mechanical vibrations on optical fiber links across the optical network using the interferometry based sensing techniques and schemes. As such, the optical span in the optical network may be converted into an interferometry based sensing system (or interferometry based sensing media).

As illustrated in FIG. 11 the returning signals resulting from the transmitted optical probe signal are received at coupler 1102. For each optical probe signal there will be one returning signal from the counter clockwise propagation of the optical probe signal and one returning signal from the clockwise propagation of the optical probe signal. The resultant of these coupled signals is transferred to photodetector 1104 for detection, and the detected optical signal is subsequently transmitted to a digital signal processor 1106 for analysis. As previously discussed, for an interferometric analysis the resultant of the coupled optical signals can result in a destructive combination, thus substantially cancelling each other out upon coupling, when essentially no perturbations are experienced by the optical probe signal. However, when perturbations are experienced by the optical probe signal, the digital signal processor can be configured to analyses the output from the photodetector in order to evaluate the magnitude and location of the one or more perturbations along the optical link being evaluated.

It will be understood that the output from the photodetector can be transmitted to a local signal processing system or alternately can be transmitted to a regional network processing system or an overall network processing system. This configuration can dependent on the desired functionality of the optical link testing mechanism. In other embodiments, the evaluation of the output of the photodetector may be performed locally and output of the analysis can be subsequently transmitted to a regional or overall network processing system for the determination of subsequent actions to be taken if necessary.

Figure 12:
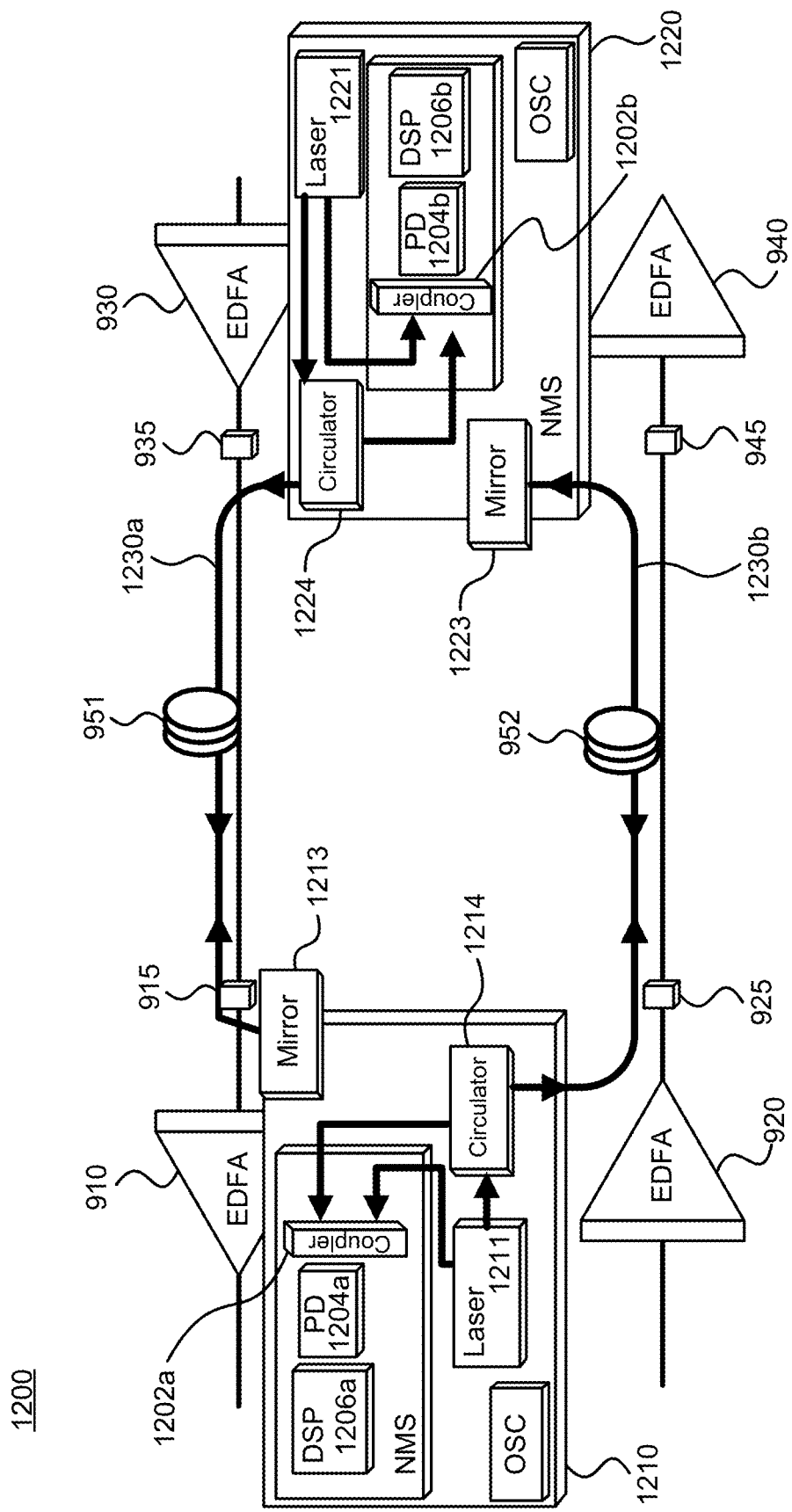
FIG. 12 illustrates, in a schematic diagram, an example implementation for converting an optical span into an interferometry based sensing mechanism for existing optical transport networks, in accordance with embodiments.

FIG. 12 illustrates an example of interferometry based sensing mechanism including the probe transceiver component and loop back component, in accordance with embodiments. The interferometry based sensing modules 1210 and 1220 are configured to perform the functionalities of the probe transceiver module (e.g. transceiver functionality) and the loop back module (e.g. loop back functionality). The interferometry based sensing modules 1210 and 1220 may send and receive the optical probe signals to provide the loop back of the optical probe signals. Embodiments illustrated in FIG. 12 or similar embodiments may allow individual assessment of the optical fibers 951 and 952 for detecting mechanical perturbations or damage that occur thereto.

According to embodiments, similar to the interferometry based sensing mechanism 1000 illustrated in FIG. 10, the interferometry based sensing mechanism 1200 may use the waveband filters operating at one or more pre-defined wavelengths (e.g. WBFs 915, 925, 935, 945) to convert an optical span (e.g. amplifier-to-amplifier, EDFA 910-to-EDFA 930, EDFA 920-to-EDFA 940) into a sensing loop (e.g. sensing loops 1230a, 1230b). However, unlike the interferometric sensing loop 1030 in FIG. 10, which requires existing fibers in both directions (e.g. both fibers 951 and 952), only one fiber (e.g. either fibers 951 or 952) may be required to obtain the sensing loop (e.g. each of sensing loops 1230a and 1230b).

According to embodiments, the interferometry based sensing modules 1210 and 1220 may comprise components substantially similar to the components of the probe transceiver module (e.g. probe transceiver module 1010) of the interferometry based sensing mechanism 1000 illustrated in FIG. 10. Similar to the probe transceiver module 1010, the interferometry based sensing modules 1210 and 1220 may comprise coupler (e.g. coupler 1202a and 1202b), photodetector (e.g. photodetectors 1204a and 1204b) and digital signal processor (e.g. digital signal processors 1206a and 1206b). The functionalities of these components may be substantially equivalent to the functionalities of the coupler 1002, the photodetector 1004, the digital signal processor 1006, respectively. However, unlike the probe transceiver module 1010, which comprises two circulators (e.g. circulators 1013 and 1014), each of the interferometry based sensing modules 1210 and 1220 may include one circulator (e.g. circulators 1214 and 1224) and one mirror (e.g. mirrors 1213 and 1223) configured to perform the loopback functionality.

According to embodiments, the interferometry based sensing modules 1210 and 1220 can perform the both probe transceiver functionality and loop back functionality from the perspective of the interferometry based sensing mechanism of the transformed optical span. In some embodiments, the interferometry based sensing modules 1210 and 1220 may be integrated into other existing pluggable components such as OSC-SFPs. In some embodiments, the modules 1210 and 1220 may have added the functionality of sensing mechanical vibrations when needed. In some embodiments, the interferometry based sensing modules 1210 and 1220 may operate in parallel to the OSC channel.

In some embodiments, the interferometry based sensing modules 1210 and 1220 may send and receive signals in a single wavelength to perform mechanical perturbation detection. In some embodiments, the interferometry based sensing modules 1210 and 1220 may send and receive signals in multiple wavelengths to simultaneously perform independent parallel mechanical perturbation detections for both optical fiber links.

According to embodiments, various components of the interferometry based sensing mechanism 1200 may be communicatively connected to each other. Referring to FIG. 12, the fiber optic cables 951 and 952 may be communicatively connected to the interferometry based sensing modules 1210 and 1220 using the WBFs 915, 925, 935 and 945. The WBFs 915 and 925 may be communicatively connected to each other through the module 1210, and the WBFs 935 and 945 may be communicatively connected to each other through the module 1220.

According to embodiments, two sensing loops (e.g. sensing loops 1230a and 1230b) may be created using existing line components (e.g. the waveband filters and fiber optic cables) together with the interferometry based sensing modules 1210 and 1220. According to embodiments, the optical probe signal may be propagating in both directions on each of the fiber optic cables 951 and 952 in the interferometry based sensing mechanism 1200. The interferometry based sensing modules 1210 and 1220 of the interferometry based sensing mechanism 1200 can detect the occurrence and location of mechanical vibrations on the optical links using existing interferometry based sensing techniques, wherein the combination of the returning optical probe signal is based on a combination of the returning optical probe signal and the optical probe signal.

Referring to FIG. 12, the optical probe signal may be sent from the interferometry based sensing module 1210 to the interferometry based sensing module 1220 along the fiber optic cable 952. The optical signal may be generated from the laser source component 1211. The optical signal generated from the laser source component 1211 may be transmitted to the coupler 1202a. The optical signal generated from the laser source component 1211 may be also transmitted to the mirror 1223 of the interferometry based sensing module 1220 through the circulator 1214 and the fiber optic cable 952. The optical probe signal transmitted to the interferometry based sensing module 1220 may be reflected by the mirror 1223. As such, the returning signal resulting from the transmitted optical probe signal transmitted back to the interferometry based sensing module 1210. The itinerary of the optical probe signal transmitted between the interferometry based sensing modules 1210 and 1220 along the fiber optic cable 952 defines the sensing loops 1230a.

The returning signal resulting from the transmitted optical probe signal may be received at the coupler 1202a. For each optical probe signal, the coupler 1202a may receive one returning signal and one optical probe signal directly transmitted from the laser source 1211. The two received signals are coupled at the coupler 1202a. The resultant of these coupled signals is transferred to photodetector 1204a for detection, and the detected optical signal is subsequently transmitted to a digital signal processor 1206a for analysis.

According to some embodiments, the interferometry based sensing module 1210 can be configured to transmit an optical probe signal along fiber optical cable 951 as well as fiber optic cable 952. As such, the evaluation of fiber optic cable 951 and 952 can be provided by a single interferometry based sensing module, e.g. module 1210. In this embodiment, the optical probe signal generated by laser 1211 can be initially transmitted along fiber optic cable 952 with the returning optical probe signal being coupled with the initial optical probe signal at the coupler 1202a for subsequent analysis to evaluate conditions of fiber optic cable 952. Through the inclusion of an optical switch (not shown), for example located after circulator 1214, an optical probe signal generated by laser 1211 can also be transmitted along fiber optic cable 951. A suitably positioned and tuned mirror (not shown) proximate to the opposite end of fiber optic cable 951 (e.g. the end of fiber optic cable 951 proximate to interferometry based sensing module 1220 in FIG. 12)) can enable the reflection of this optical probe signal resulting in a returning optical probe signal being received at the coupler 1202a after travelling along fiber optic cable 951. This returning optical probe signal can be coupled with the initial optical probe signal at the coupler 1202a for subsequent analysis to evaluate conditions of fiber optic cable 951. In this manner, interferometry based sensing module 1210 can evaluate conditions of both fiber optic cables 951 and 952.

According to embodiments, the optical probe signal can be sent from the interferometry based sensing module 1220 to the interferometry based sensing module 1210 along the fiber optic cable 951. The optical signal may be generated from the laser source component 1221. The optical signal generated from the laser source component 1221 may be transmitted to the coupler 1202b. The optical signal generated from the laser source component 1221 may be also transmitted to the mirror 1213 of the interferometry based sensing module 1210 through the circulator 1224 and the fiber optic cable 951. The optical probe signal transmitted to the interferometry based sensing module 1210 may be reflected by the mirror 1213. As such, the returning signal resulting from the transmitted optical probe signal transmitted back to the interferometry based sensing module 1220. The itinerary of the optical probe signal transmitted between the interferometry based sensing modules 1210 and 1220 along the fiber optic cable 951 defines the sensing loops 1230b.

The returning signal resulting from the transmitted optical probe signal may be received at the coupler 1202b. For each optical probe signal, the coupler 1202b may receive one returning signal and one optical probe signal directly transmitted from the laser source 1221. The two received signals are coupled at the coupler 1202b. The resultant of these coupled signals is transferred to photodetector 1204b for detection, and the detected optical signal is subsequently transmitted to a digital signal processor 1206b for analysis.

According to some embodiments, the interferometry based sensing module 1220 can be configured to transmit an optical probe signal along fiber optical cable 951 as well as fiber optic cable 951. As such, the evaluation of fiber optic cable 951 and 952 can be provided by a single interferometry based sensing module, e.g. module 1220. In this embodiment, the optical probe signal generated by laser 1221 can be initially transmitted along fiber optic cable 951 with the returning optical probe signal being coupled with the initial optical probe signal at the coupler 1202*b* for subsequent analysis to evaluate conditions of fiber optic cable 951. Through the inclusion of an optical switch (not shown), for example located after circulator 1224, an optical probe signal generated by laser 1221 can also be transmitted along fiber optic cable 952. A suitably positioned and tuned mirror (not shown) proximate to the opposite end of fiber optic cable 952 (e.g. the end of fiber optic cable 952 proximate to interferometry based sensing module 1210 in FIG. 12)) can enable the reflection of this optical probe signal resulting in a returning optical probe signal being received at the coupler 1202*b* after travelling along fiber optic cable 952. This returning optical probe signal can be coupled with the initial optical probe signal at the coupler 1202*b* for subsequent analysis to evaluate conditions of fiber optic cable 952. In this manner, interferometry based sensing module 1220 can evaluate conditions of both fiber optic cables 951 and 952.

According to embodiments, one or both of interferometry based sensing module 1210 and interferometry based sensing module 1220 can propagate optical probe signals to both of the fiber optic cables 951 and 952. In some embodiments, the propagation of the optical signals on both fiber optical cables 951 and 952 can be implemented by controlling the directions of the optical probe signals generated by the laser sources 1211 and 1221. The directions of the optical probe signals may be controlled using the circulators 1214 and 1224. In some embodiments, the interferometry based sensing module 1210 and the interferometry based sensing module 1220 may include one or more switches (e.g. 1×2 switch presented in FIG. 11) to control or change the direction of the optical probe signal. Using such switches, the interferometry based sensing module 1210 and the interferometry based sensing module 1220 can propagate the optical probe signals to both of the fiber optic cables 951 and 952. In some embodiments, the interferometry based sensing module 1210 and the interferometry based sensing module 1220 may include one or more splitters so that the interferometry based sensing module 1210 and the interferometry based sensing module 1220 can propagate the optical probe signals to both of the fiber optic cables 951 and 952 at the same time.

It will be understood and in some embodiments, only one of interferometry based sensing module 1210 and the interferometry based sensing module 1220 are provided for the evaluation of conditions of both fiber optic cables 951 and 952. In other embodiments, by enabling interferometry based sensing module 1210 and the interferometry based sensing module 1220 to each evaluate the conditions of fiber optic cables 951 and 952, a level of redundancy of the evaluation process can be provide, for example in terms of confirmation of the evaluation of the conditions determined by one interferometry based sensing module with the other interferometry based sensing module.

As previously discussed, for an interferometric analysis the resultant of the coupled optical signals (e.g. signals coupled at the couplers 1202*a* and 1202*b*) can result in a destructive combination, thus substantially cancelling each other out upon coupling when there is essentially no perturbations experienced by the optical probe signal. However, when perturbations are experienced by the optical probe signal, the digital signal processor can be configured to analyses the output from the photodetector in order to evaluate the magnitude and location of the one or more perturbations along the optical link being evaluated.

It will be understood that the output from the photodetector can be transmitted to a local signal processing system or alternately can be transmitted to a regional network processing system or an overall network processing system. This configuration can dependent on the desired functionality of the optical link testing mechanism. In other embodiments, the evaluation of the output of the photodetector may be performed locally and output of the analysis can be subsequently transmitted to a regional or overall network processing system for the determination of subsequent actions to be taken if necessary.

Embodiments require minimal changes in the control strategy to support the super channel actions. As illustrated above, in various embodiments, the existing optical span (e.g. optical link between to network nodes such as amplifiers or ROADMs) may be converted into a recirculating sensing loop (e.g. interferometric sensing loop) using interferometry based sensing techniques and hardware characteristics of the optical nodes (e.g. EDFAs) and optical fibers. As a result, overall cost (e.g. cost for hardware, software, operation, upgrade, etc.) to establish a system for detecting occurrence and location of damages on optical fiber links with embodiments may be considerably low.

Embodiments provide several benefits and advantages. For instance, due to simple control strategy, application of known sensing techniques to the future super channel may become available with little cost. Also, the sensing techniques used in various embodiments are mature and thus can be reliable.

Furthermore, embodiments can save operating and maintenance cost, especially for the network service providers. For example, there will be significant cost savings for Service Level Agreement guarantee when the network service providers, using embodiments, detect imminent network faults or optical fiber cuts and employ appropriate restoration plans. Furthermore, it is possible to detect problems on the optical fiber links and find out the location of the problems occurred, even without sending technicians to the field. Embodiments also provide transparent in-service performance measurement for optical spans therefore the network service providers can detect problems across the network (e.g. damages to the optical fiber links) even when the network is in service.

It should be noted that while the instant application has focused on using embodiments in the WDM transport network, the embodiments can be also used in other fiber optic based systems, for example, passive-optical networks (PONs) and data center interconnect.

Through the descriptions of the preceding embodiments, embodiments may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), universal serial bus (USB) flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. An apparatus for detecting operational conditions of an optical fiber, the apparatus comprising:
    a probe transceiver module communicatively connected to a first end of a first optical fiber span and a first end of a second optical fiber span in an optical network, the probe transceiver module comprising:
        a transmitter to send an optical probe signal, the optical probe signal being transmitted into both the first end of the first optical fiber span and the first end of the second optical fiber span; and
        a receiver to receive a first returning optical probe signal from the first end of the first optical fiber span and a second returning optical probe signal from the first end of the second optical fiber span; and
    a loop back module communicatively connected to a second end of the first optical fiber span and a second end of the second optical fiber span, the loop back module configured to transfer optical signals between the first optical fiber span and the second optical fiber span;
    wherein the probe transceiver module and the loopback module are integrated into an optical supervisory channel (OSC) module and enable conversion of said first optical fiber span and said second optical fiber span into an interferometry-based sensing medium;
    wherein combining of the first returning optical probe signal and the second returning optical probe signal enables detection of operational conditions of the optical fiber including the first optical fiber span and the second optical fiber span.

2. The apparatus of claim 1, wherein the receiver comprises:
    a coupler communicatively connected to the first end of the first optical fiber span and the first end of the second optical fiber span, the coupler configured to combine the first returning optical probe signal and the second optical probe signal; and
    a photodiode for detecting a signal indicative of the combination of the first returning optical probe signal and the second returning optical probe signal, wherein the signal is indicative of the operational conditions of the optical fiber.

3. The apparatus of claim 2, further comprising a digital signal processor configured to evaluate the signal for determination of the operational conditions of the optical fiber.

4. The apparatus of claim 3, wherein the digital signal processor forms a portion of the probe transceiver module.

5. The apparatus of claim 3, wherein the digital signal processor is remote from the probe transceiver module and is communicatively connected to the probe transceiver module for receiving the signal.

6. The apparatus of claim 1, wherein the probe transceiver module further includes a circulator configured to control directional flow of the optical probe signal.

7. The apparatus of claim 1, wherein the operational conditions include one or more of vibrations and a location of the vibrations.

8. The apparatus of claim 1, wherein the transmitter generates multiple optical probe signals at one or more wavelengths.

9. The apparatus of claim 1, wherein one or more functions of the probe transceiver module are performed by the OSC module.

10. An apparatus for detecting operational conditions of an optical fiber, the apparatus comprising:
    a probe transceiver module communicatively connected to a first end of an optical fiber span, the probe transceiver module comprising:
        a transmitter to send an optical probe signal, the optical probe signal being transmitted into the first end of the optical fiber span; and
        a receiver to receive a returning optical probe signal from the first end of the optical fiber span; and
    a loop back module communicatively connected to a second end of the optical fiber span, the loop back module configured to reflect the optical probe signal back to the probe transceiver module along the optical fiber span;
    wherein the probe transceiver module and the loopback module are integrated into an optical supervisory channel (OSC) module and enable conversion of said first optical fiber span and said second optical fiber span into an interferometry-based sensing medium; and
    wherein combining of the returning optical probe signal and the optical probe signal enables detection of operational conditions of the optical fiber of the optical fiber span.

11. The apparatus of claim 10, wherein the receiver comprises:
    a coupler communicatively connected to the first end of the optical fiber span and the transmitter, the coupler configured to combine the returning optical probe signal and the optical probe signal; and
    a photodiode for detecting a signal indicative of the combination of the returning optical probe signal and the optical probe signal, wherein the signal is indicative of the operational conditions of the optical fiber.

12. The apparatus of claim 11, further comprising a digital signal processor configured to evaluate the signal for determination of the operational conditions of the optical fiber.

13. The apparatus of claim 12, wherein the digital signal processor forms a portion of the probe transceiver module.

14. The apparatus of claim 12, wherein the digital signal processor is remote from the probe transceiver module and is communicatively connected to the probe transceiver module for receiving the signal.

15. The apparatus of claim 10, wherein the transmitter generates multiple optical probe signals at one or more wavelengths.

16. The apparatus of claim 10, wherein one or more functions of the probe transceiver module are performed by the OSC module.

17. An apparatus for detecting operational conditions of optical fibers, the apparatus comprising:

at least two probe transceiver modules, each probe transceiver module comprising:
    a transmitter to send an optical probe signal;
    a receiver to receive an optical probe signal;
at least two pairs of switchable means,
    each switchable means of a first pair separately communicatively connected to one of the switchable means of another pair at the opposite ends of an optical fiber span;
    each switchable means of each pair communicatively connected to a corresponding probe transceiver module of the at least two probe transceiver modules and to the other switchable means of that pair;
    each pair of switchable means having two synchronized alternate states,
        in the first state,
            at a first end of a span,
                each switchable means of the first pair configured to transfer optical signals between the optical fiber span and the corresponding probe transceiver module, the corresponding probe transceiver module configured to:
                    send an optical probe signal, the optical probe signal being transmitted into each optical fiber span;
                    receive a first returning optical probe signal, and a second returning optical probe signal, respectively from each optical fiber span;
                    wherein combining of the first returning optical probe signal and the second returning optical probe signal received at the corresponding probe transceiver module enables detection of operational conditions of the optical fiber spans;
            at an opposite end of a span,
                each switchable means of the pair communicatively connected at the opposite ends of the optical fiber spans configured to transfer optical signals therebetween;
        in the alternate state,
            at the first end of a span,
                each switchable means of the first pair configured to transfer optical signals therebetween,
            at an opposite end of a span,
                each switchable means of the pair communicatively connected at the opposite ends of the optical fiber spans configured to transfer optical signals between the optical fiber span and the corresponding probe transceiver module, the corresponding probe transceiver module configured to:
                    send an optical probe signal, the optical probe signal being transmitted into each optical fiber span;
                    receive a first returning optical probe signal, and a second returning optical probe signal, respectively from each optical fiber span;
                    wherein combining of the first returning optical probe signal and the second returning optical probe signal received at the corresponding probe transceiver module enables detection of operational conditions of the optical fiber spans;
    wherein the at least two probe transceiver modules and the at least two pairs of switchable means enable conversion of said first optical fiber span and said second optical fiber span into an interferometry-based sensing medium.

18. The apparatus of claim 17, wherein each pair of switchable means is a first and a second 1×2 bidirectional switch, each 1×2 bidirectional switch comprising:
    a common port;
    a first switchable port; and
    a second switchable port;
    wherein the common port of each of the first and the second 1×2 bidirectional switches are communicatively connected, respectively, to the optical fiber span;
    wherein the first switchable port of each of the first and the second 1×2 bidirectional switches are both communicatively connected to the corresponding probe transceiver module; and
    wherein the second switchable port of each of the first and the second 1×2 bidirectional switches are communicatively connected to each other.

19. The apparatus of claim 17, wherein the receiver comprises:
    a coupler communicatively connected to the first end of the first optical fiber span and the first end of the second optical fiber span, the coupler configured to combine the first returning optical probe signal and the second optical probe signal; and
    a photodiode for detecting a signal indicative of the combination of the first returning optical probe signal and the second returning optical probe signal, wherein the signal is indicative of the operational conditions of the optical fiber.

20. The apparatus of claim 17, further comprising a digital signal processor configured to evaluate the signal for determination of the operational conditions of the optical fiber.

21. The apparatus of claim 20, wherein the digital signal processor forms a portion of one of the at least two probe transceiver modules.

22. The apparatus of claim 20, wherein the digital signal processor is remote from one of the at least two probe transceiver modules and is communicatively connected to the probe transceiver module for receiving the signal.

23. The apparatus of claim 17, wherein one of the at least two probe transceiver modules further includes a circulator configured to control directional flow of the optical probe signal.

24. The apparatus of claim 17, wherein the optical probe signal is generated by a laser.

25. The apparatus of claim 17, wherein the transmitter generates multiple optical probe signals at one or more wavelengths.

* * * * *